United States Patent
Zhuang et al.

(10) Patent No.: US 11,799,774 B2
(45) Date of Patent: Oct. 24, 2023

(54) METHOD, DEVICE, AND SYSTEM FOR DETERMINING ROUTE LEAK

(71) Applicant: HUAWEI TECHNOLOGIES CO., LTD., Guangdong (CN)

(72) Inventors: Shunwan Zhuang, Beijing (CN); Yunan Gu, Beijing (CN); Haibo Wang, Beijing (CN); Gang Yan, Beijing (CN); Zhenbin Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 400 days.

(21) Appl. No.: 17/215,710

(22) Filed: Mar. 29, 2021

(65) Prior Publication Data
US 2021/0234797 A1    Jul. 29, 2021

Related U.S. Application Data

(63) Continuation of application No. PCT/CN2019/106072, filed on Sep. 17, 2019.

(30) Foreign Application Priority Data

Sep. 30, 2018 (CN) .......................... 201811158313.4

(51) Int. Cl.
*H04L 45/74* (2022.01)
*H04L 45/02* (2022.01)
(Continued)

(52) U.S. Cl.
CPC ............. *H04L 45/74* (2013.01); *H04L 45/02* (2013.01); *H04L 45/70* (2013.01); *H04L 67/01* (2022.05); *H04L 69/22* (2013.01)

(58) Field of Classification Search
None
See application file for complete search history.

(56) References Cited

U.S. PATENT DOCUMENTS

| 8,675,664 | B1 | 3/2014 | Kamath et al. |
| 11,032,184 | B2 * | 6/2021 | Li .......................... H04L 45/70 |

(Continued)

FOREIGN PATENT DOCUMENTS

| CN | 101005500 A | 7/2007 |
| CN | 101252488 A | 8/2008 |

(Continued)

OTHER PUBLICATIONS

Orsini Chiara et al., "BGPStream:a framework for historical analysis and real-time monitoring of BGP data", Sep. 30, 2015, XP055824662, total 18 pages.

(Continued)

*Primary Examiner* — Brian S Roberts
(74) *Attorney, Agent, or Firm* — WOMBLE BOND DICKINSON (US) LLP

(57) ABSTRACT

This disclosure discloses a method, device, and system for determining a route leak. The method includes: receiving, by a network monitoring device managing a first autonomous system, an extended BMP packet sent by a first border node of the first autonomous system and an extended BMP packet sent by a second border node of the first autonomous system. The method includes determining, based on the extended BMP packet sent by the first border node and the extended BMP packet sent by the second border node of the first autonomous system, a receiving relationship of a route prefix received by the first border node from the second autonomous system, and a sending relationship of the route prefix sent by the second border node to a third autonomous system. The method further includes determining, based on the receiving relationship and the sending relationship, whether the route prefix is leaked.

12 Claims, 14 Drawing Sheets

(51) Int. Cl.
*H04L 45/00* (2022.01)
*H04L 69/22* (2022.01)
*H04L 67/01* (2022.01)

(56) References Cited

U.S. PATENT DOCUMENTS

| | | | |
|---|---|---|---|
| 2014/0351452 | A1 | 11/2014 | Bosch et al. |
| 2017/0346727 | A1* | 11/2017 | Perrett .................... H04L 45/28 |
| 2018/0227212 | A1* | 8/2018 | Ferguson ................ H04L 45/22 |

FOREIGN PATENT DOCUMENTS

| | | | |
|---|---|---|---|
| CN | 101588343 | A | 11/2009 |
| CN | 102104550 | A | 6/2011 |
| CN | 102148832 | A | 8/2011 |
| CN | 102394794 | A | 3/2012 |
| CN | 103236978 | A | 8/2013 |
| CN | 103609080 | A | 2/2014 |
| CN | 105281942 | A | 1/2016 |
| CN | 105991567 | A | 10/2016 |
| CN | 106059916 | A | 10/2016 |
| CN | 106060014 | A | 10/2016 |
| CN | 106161256 | A | 11/2016 |
| CN | 106487709 | A | 3/2017 |
| CN | 106982162 | A | 7/2017 |
| CN | 107409092 | A | 11/2017 |
| CN | 108134707 | A | 6/2018 |
| CN | 107005474 | B | 10/2020 |

OTHER PUBLICATIONS

Jia Jia et al, Study on BGP route leak, Chinese Journal of Network and Information Security, vol. 2 No. 8, Aug. 2016, With an English Abstract, Total 8 Pages.

M. S. Siddiqui et al, Route leak detection using real-time analytics on local BGP information, 2014 IEEE Global Communications Conference, Date of Conference: Dec. 8-12, 2014, Date Added to IEEE Xplore: Feb. 12, 2015, Total 8 Pages.

Request for Comments: 7854, J. Scudder, Ed. et al, BGP Monitoring Protocol (BMP), Internet Engineering Task Force (IETF), Jun. 2016, Total 27 Pages.

Dainoti Alberto et al.,"HIJACKS:Detecting and Characterizing Internet Traffic Intercepion based on BGP Hijacking", HIJACKS:Proposal-CAIDA, Aug. 20, 2014, pp. 1-10,XP055824666, total 10 pages.

Request for Comments: 7908, K. Sriram et al, Problem Definition and Classification of BGP Route Leaks, Internet Engineering Task Force (IETF), Jun. 2016, Total 11 Pages.

T.Euens et al., "Support for Adj-RIB-Out in BGP Monitoring Protocol (BMP), draft-ietf-grow-bmp-adj-rib-out-02", Sep. 17, 2018, pp. 1-10, XP015128573, total 10 pages.

\* cited by examiner

METHOD, DEVICE, AND SYSTEM FOR DETERMINING ROUTE LEAK

CROSS-REFERENCE TO RELATED APPLICATIONS

This application is a continuation of International Application No. PCT/CN2019/106072, filed on Sep. 17, 2019, which claims priority to Chinese Patent Application No. 201811158313.4, filed on Sep. 30, 2018. The disclosures of the aforementioned applications are hereby incorporated by reference in their entireties.

TECHNICAL FIELD

The present disclosure relates to the communications field, and in particular, to a method and system for determining a route leak.

BACKGROUND

A route leak means that a transmission range of a route advertisement exceeds an expected range. When an autonomous system (AS) advertises a border gateway protocol (BGP) route learned by the AS to another AS, if the advertisement violates a routing policy of a route sender AS, a routing policy of a route receiver AS, and/or a routing policy of an AS that the advertisement passes through, the route leak occurs. For example, these routing policies may be determined based on business relationships between ASs. The business relationships between ASs include: a customer-to-provider (C2P) relationship, a peer-to-peer (P2P) relationship, or a provider-to-client (P2C) relationship. For a definition of the route leak and several situations that cause the route leak, refer to a definition of the standardization organization IETF in the RFC 7908.

In the prior art, a network administrator configures an export policy on each border router of an AS. For example, the export policy is configured on a border node R2 of an AS 1. For example, the export policy is that a route from an AS 2 can be advertised to an AS 3 but not an AS 4. After a border node R1 of the AS 1 receives a piece of routing information A from the AS 2, R1 modifies the routing information A, marks in A that A comes from the AS 2, and then transmits the routing information A with the mark to the border node R2 of the AS 1 through an intermediate node of the AS 1. For example, if a destination AS of the routing information A is the AS 4, the border node R2 determines whether to send A to the AS 4 according to the export policy. However, if configuration of R2 is incorrect, the route that should not be sent is sent. Therefore, the route leak occurs.

When there are a large quantity of devices in the AS 1, it is difficult for the network administrator to effectively check whether the route leak occurs in the AS 1. In addition, in the prior art, a BGP route advertisement protocol needs to be modified, for example, a BGP update message needs to be modified. This causes a compatibility problem involved in a solution implementation.

SUMMARY

This disclosure provides a method, device, and system for determining a route leak. A network monitoring device analyzes a business relationship of receiving and sending routing information between ASs carried in a Border Gateway Protocol Monitoring Protocol (BMP) packet reported by each border node of an autonomous system managed by the network monitoring device. In this way, the network monitoring device can effectively check whether a route leak occurs in the autonomous system managed by network monitoring device.

According to a first aspect, the present disclosure provides a method for determining a route leak, which is applied to a network monitoring device. The network monitoring device manages a first autonomous system. The method includes: receiving an extended border gateway protocol monitoring protocol BMP packet sent by a first border node of the first autonomous system and an extended BMP packet sent by a second border node of the first autonomous system; determining, based on the extended BMP packet sent by the first border node and the extended BMP packet sent by the second border node of the first autonomous system, a receiving relationship of a route prefix that has been received by the first border node from a second autonomous system, and a sending relationship of the route prefix that has been sent by the second border node to a third autonomous system, where the receiving relationship is a client-to-provider relationship, a peer-to-peer relationship, or a provider-to-client relationship, and the sending relationship is the client-to-provider relationship, the peer-to-peer relationship, or the provider-to-client relationship; and determining, based on the receiving relationship and the sending relationship, whether the route prefix is leaked.

The receiving relationship of the route prefix is a business relationship between a sender AS of the route prefix and a receiver AS of the route prefix when a border node of the receiver AS receives the route prefix. The sending relationship of the route prefix is a business relationship between a sender AS of the route prefix and a receiver AS of the route prefix when a border node of the sender AS of the route prefix sends the route prefix to the receiver AS.

When the foregoing method is used, the network monitoring device determines, based on a BMP packet reported by a route ingress border node of an autonomous system managed by the network monitoring device and a BMP packet reported by a route egress border node of the autonomous system managed by the network monitoring device, a receiving relationship of a route prefix that has been received by the route ingress border node and a sending relationship of a same route prefix that has been sent by the route egress border node. This can effectively check whether the route prefix is leaked. In addition, in the foregoing method, a BGP route transmission mechanism does not need to be modified (for example, a BGP update message does not need to be modified). This avoids a compatibility problem involved in a solution implementation.

In one embodiment, the network monitoring device receives a first extended BMP route monitoring packet sent by the first border node. The first extended BMP route monitoring packet carries the receiving relationship. The network monitoring device receives a second extended BMP route monitoring packet sent by the second border node. The second extended BMP route monitoring packet carries the sending relationship. The network monitoring device determines the receiving relationship and the sending relationship based on the receiving relationship carried in the first extended BMP route monitoring packet and the sending relationship carried in the second extended BMP route monitoring packet.

In this embodiment, the network monitoring device may directly obtain a receiving relationship and a sending relationship that are of a route prefix from an extended BMP route monitoring packet, and does not need to refer to information about another type of BMP packet. Therefore, for the network monitoring device, workload of comparison analysis is less.

In one embodiment, the network monitoring device receives a first extended BMP peer up notification packet sent by the first border node. The first extended BMP peer up notification packet carries a receiving relationship rule for receiving, by the first border node, routing information from the second autonomous system. The receiving relationship rule includes receiving based on the client-to-provider relationship, receiving based on the peer-to-peer relationship, or receiving based on the provider-to-client relationship. The network monitoring device receives a second extended BMP peer up notification packet sent by the second border node. The second extended BMP peer up notification packet carries a sending relationship rule for sending, by the second border node, routing information to the third autonomous system. The sending relationship rule includes sending based on the client-to-provider relationship, sending based on the peer-to-peer relationship, or sending based on the provider-to-client relationship. The network monitoring device receives a BMP route monitoring packet sent by the second border node. The BMP route monitoring packet indicates that a transfer path of the route prefix sequentially includes the second autonomous system, the first autonomous system, and the third autonomous system. The network monitoring device determines the receiving relationship and the sending relationship according to the receiving relationship rule carried in the first extended BMP peer up notification packet, the sending relationship rule carried in the second extended BMP peer up notification packet, and the transfer path of the route prefix carried in the BMP route monitoring packet.

In this embodiment, a BMP peer up notification packet is extended to carry a receiving relationship rule and a sending relationship rule. This prevents each BMP route monitoring packet from carrying the receiving relationship and the sending relationship. This is because the peer up notification packet is sent once when a BGP peer relationship is established, and the BMP route monitoring packet is triggered each time a border node receives or sends routing information. This embodiment can reduce repeated carrying of business relationship information. In addition, the network monitoring device may monitor only a BMP route monitoring packet sent by an egress border node. This reduces monitoring workload.

In one embodiment, the network monitoring device receives a first extended BMP peer up notification packet sent by the first border node. The first extended BMP peer up notification packet carries a receiving relationship rule for receiving, by the first border node, routing information from the second autonomous system. The receiving relationship rule includes receiving based on the client-to-provider relationship, receiving based on the peer-to-peer relationship, or receiving based on the provider-to-client relationship. The network monitoring device receives a second extended BMP peer up notification packet sent by the second border node. The second extended BMP peer up notification packet carries a sending relationship rule for sending, by the second border node, routing information to the third autonomous system. The sending relationship rule includes sending based on the client-to-provider relationship, sending based on the peer-to-peer relationship, or sending based on the provider-to-client relationship. The network monitoring device receives a first BMP route monitoring packet sent by the first border node. The first BMP route monitoring packet indicates that the first border node has received the route prefix from the second autonomous system. The network monitoring device receives a second BMP route monitoring packet sent by the second border node. The second BMP route monitoring packet indicates that the second border node has sent the route prefix to the third autonomous system. The network monitoring device determines the receiving relationship and the sending relationship according to the receiving relationship rule carried in the first extended BMP peer up notification packet, the sending relationship rule carried in the second extended BMP peer up notification packet, the first BMP route monitoring packet, and the second BMP route monitoring packet.

In this embodiment, the network monitoring device can also determine whether the route prefix is leaked without depending on transmission path information that is in each AS and that is of a route prefix carried in a BMP route monitoring packet.

The foregoing receiving relationship rule or the foregoing sending relationship rule may be a granularity of a peer autonomous system, and may also be a granularity of the route prefix. The two granularities may coexist, and the granularity of the route prefix has a higher priority. In this way, the receiving relationship rule or the sending relationship rule can be more flexible.

In one embodiment, after determining that a route leak occurs in the route prefix, the network monitoring device outputs alarm information. The alarm information indicates that the route prefix is leaked from the first autonomous system to the third autonomous system. In this way, a network administrator can obtain a prompt of the route leak in time, locate the leaked route prefix and an area in which the route leak occurs, and check an export policy of a border node, to find faulty policy configuration.

In one embodiment, the network monitoring device determines, according to the following rules, whether the route prefix is leaked. If the receiving relationship is the peer-to-peer relationship, and the sending relationship is the peer-to-peer relationship, the network monitoring device determines that the route prefix is leaked. If the receiving relationship is the peer-to-peer relationship, and the sending relationship is the client-to-provider relationship, the network monitoring device determines that the route prefix is leaked. If the receiving relationship is the provider-to-client relationship, and the sending relationship is the peer-to-peer relationship, the network monitoring device determines that the route prefix is leaked. If the receiving relationship is the provider-to-client relationship, and the sending relationship is the client-to-provider relationship, the network monitoring device determines that the route prefix is leaked.

According to a second aspect, the present disclosure provides a method for determining a route leak, which is applied to a routing device. The routing device is a border node of a first autonomous system. The routing device determines a receiving relationship of a route prefix that has been received from a second autonomous system. The receiving relationship is a client-to-provider relationship, a peer-to-peer relationship, or a provider-to-client relationship. The routing device generates an extended BMP route monitoring packet. The extended BMP route monitoring packet includes the receiving relationship. The routing device sends the extended BMP route monitoring packet to a network monitoring device of the first autonomous system.

When the foregoing manner is used, the routing device reports, to the network monitoring device, the receiving relationship of the route prefix that has been received from the second autonomous system. This helps the network monitoring device determine, with reference to a sending relationship of the route prefix, whether the route prefix is leaked.

In one embodiment, the routing device obtains a receiving relationship rule for receiving routing information that is from the second autonomous system. The receiving relationship rule includes receiving based on the client-to-provider relationship, receiving based on the peer-to-peer relationship, or receiving based on the provider-to-client relationship. The routing device receives routing information that is from the second autonomous system and that includes the prefix. The routing device determines the receiving relationship according to the receiving relationship rule.

In one embodiment, the receiving relationship rule is configured on the routing device.

In one embodiment, an extension manner of the extended BMP route monitoring packet is to add an extension field, and a packet format of the extension field is a type-length-value format. A value of a type field being a first preset value indicates a relationship between a route prefix source autonomous system and a local autonomous system, and the value of the type field being a second preset value indicates a relationship between a local autonomous system and a destination autonomous system to which a route prefix is sent. A value of a value field being a third preset value indicates the client-to-provider relationship, the value of the value field being a fourth preset value indicates the peer-to-peer relationship, and the value of the value field being a fifth preset value indicates the provider-to-client relationship. For example, the first preset value is 1, the second preset value is 2, the third preset value is 1, the fourth preset value is 2, and the fifth preset value is 3.

In one embodiment, the value of the type field being a sixth preset value indicates information about a relationship between ASs. A format of the value field may be (a sender AS, a receiver AS, a business relationship). A value of the business relationship being the third preset value indicates the client-to-provider relationship, the value of the business relationship being the fourth preset value indicates the peer-to-peer relationship, and the value of the business relationship being the fifth preset value indicates the provider-to-client relationship.

According to a third aspect, the present disclosure provides a method for determining a route leak, which is applied to a routing device. The routing device is a border node of a first autonomous system. The routing device determines a sending relationship of a route prefix that has been sent to a third autonomous system. The sending relationship is a client-to-provider relationship, a peer-to-peer relationship, or a provider-to-client relationship. The routing device generates an extended BMP route monitoring packet. The extended BMP route monitoring packet includes the sending relationship. The routing device sends the extended BMP route monitoring packet to a network monitoring device of the first autonomous system.

Similar to the second aspect, the routing device reports, to the network monitoring device, the sending relationship of the route prefix that has been sent to the third autonomous system. This helps the network monitoring device determine, with reference to receiving information about the route prefix, whether the route prefix is leaked.

In one embodiment, the routing device obtains a sending relationship rule for sending routing information to the third autonomous system. The sending relationship rule includes sending based on the client-to-provider relationship, sending based on the peer-to-peer relationship, or sending based on the provider-to-client relationship. The routing device determines the sending relationship according to the sending relationship rule.

In one embodiment, the sending relationship rule is configured on the routing device.

In one embodiment, the routing device first sends the route prefix to the third autonomous system, and then determines the sending relationship according to the sending relationship rule. Alternatively, the routing device may first determine the sending relationship according to the sending relationship rule, and then send the route prefix to the third autonomous system.

In one embodiment, a BMP route monitoring packet is extended in a manner the same as that in the second aspect.

According to a fourth aspect, the present disclosure provides a method for determining a route leak, which is applied to a routing device. The routing device is a border node of a first autonomous system. The routing device obtains a receiving relationship rule for receiving routing information from a second autonomous system. The receiving relationship rule includes receiving based on a client-to-provider relationship, receiving based on a peer-to-peer relationship, or receiving based on a provider-to-client relationship. The routing device generates an extended BMP peer up notification packet. The extended BMP peer up notification packet includes the receiving relationship rule. The routing device sends the extended BMP peer up notification packet to a network monitoring device of the first autonomous system.

When the foregoing manner is used, the routing device reports, to the network monitoring device, the receiving relationship rule of a route prefix that has been received from the second autonomous system. This helps the network monitoring device determine, with reference to other information, whether the route prefix is leaked.

In one embodiment, the routing device further receives routing information that is from the second autonomous system and that includes a route prefix. The routing device generates a BMP route monitoring packet based on the received routing information including the prefix. The BMP route monitoring packet carries information that is of the route prefix and that has been received by the routing device from the second autonomous system. The routing device sends the BMP route monitoring packet to the network monitoring device.

When the foregoing manner is used, after reporting the receiving relationship rule, the routing device reports the BMP route monitoring packet. This helps the network monitoring device determine a receiving relationship of the route prefix.

In one embodiment, a BMP peer up notification packet is extended in a manner the same as that in the second aspect.

According to a fifth aspect, the present disclosure provides a method for determining a route leak, which is applied to a routing device. The routing device is a border node of a first autonomous system. The routing device obtains a sending relationship rule for sending routing information to a third autonomous system. The sending relationship rule includes sending based on a client-to-provider relationship, sending based on a peer-to-peer relationship, or sending based on a provider-to-client relationship. The routing device generates an extended BMP peer up notification packet. The extended BMP peer up notification packet includes the sending relationship rule. The routing device sends the extended BMP peer up notification packet to a network monitoring device of the first autonomous system. Then, the routing device generates a BMP route monitoring packet. The BMP route monitoring packet carries transmission path information of a route prefix. The route prefix is a route prefix that has been sent by the routing device to the third autonomous system. The transmission path information sequentially includes a second autonomous system, the first autonomous system, and the third autonomous system. Alternatively, the BMP route monitoring packet carries information that is of the route prefix and that has been sent by the routing device to the third autonomous system. Then, the routing device sends the BMP route monitoring packet to the network monitoring device.

When the foregoing manner is used, the routing device reports, to the network monitoring device, the sending relationship rule for sending the routing information to the third autonomous system, and then reports the BMP route monitoring packet corresponding to the sent route prefix. This helps the network monitoring device determine, with reference to other information, whether the route prefix is leaked.

In one embodiment, a BMP peer up notification packet is extended in a manner the same as that in the second aspect.

According to a sixth aspect, the present disclosure provides a network monitoring device. The network monitoring device manages a first autonomous system, and the network monitoring device includes a processor, a memory, and a communications interface. The processor, the memory, and the communications interface are connected to each other. The communications interface is configured to perform the receiving action in any one of the first aspect or the possible embodiments of the first aspect. The memory is configured to store a computer program, and the computer program includes a program instruction. The processor is configured to invoke the program instruction to perform the determining action in any one of the first aspect or the possible embodiments of the first aspect. For details, refer to detailed descriptions in the method example in the first aspect. Details are not described herein again.

According to a seventh aspect, an embodiment of the present disclosure provides a routing device. The routing device is a border node of a first autonomous system, and the routing device includes a processor, a memory, and a communications interface. The processor, the memory, and the communications interface are connected to each other. The memory is configured to store a computer program, and the computer program includes a program instruction. The processor is configured to invoke the program instruction to perform the generation action and the determining action in any one of the second aspect or the possible embodiments of the second aspect. The communications interface is configured to perform another action in any one of the second aspect or the possible embodiments of the second aspect.

According to an eighth aspect, the present disclosure provides a routing device. The routing device is a border node of a first autonomous system, and the routing device includes a processor, a memory, and a communications interface. The processor, the memory, and the communications interface are connected to each other. The memory is configured to store a computer program, and the computer program includes a program instruction. The processor is configured to invoke the program instruction to perform the generation action and the determining action in any one of the third aspect or the possible embodiments of the third aspect. The communications interface is configured to perform another action in any one of the third aspect or the possible embodiments of the third aspect.

According to a ninth aspect, the present disclosure provides a routing device. The routing device is a border node of a first autonomous system, and the routing device includes a processor, a memory, and a communications interface. The processor, the memory, and the communications interface are connected to each other. The memory is configured to store a computer program, and the computer program includes a program instruction. The processor is configured to invoke the program instruction to perform the generation action in any one of the fourth aspect or the possible embodiments of the fourth aspect. The communications interface is configured to perform another action in any one of the fourth aspect or the possible embodiments of the fourth aspect.

According to a tenth aspect, the present disclosure provides a routing device. The routing device is a border node of a first autonomous system, and the routing device includes a processor, a memory, and a communications interface. The processor, the memory, and the communications interface are connected to each other. The memory is configured to store a computer program, and the computer program includes a program instruction. The processor is configured to invoke the program instruction to perform the generation action in any one of the fifth aspect or the possible embodiments of the fifth aspect. The communications interface is configured to perform another action in any one of the fifth aspect or the possible designs of the fifth aspect.

According to an eleventh aspect, the present disclosure provides a computer-readable storage medium. The computer-readable storage medium stores a program. When the program is run, the method according to any one of the first aspect to the fifth aspect or the possible embodiments of the first aspect to the fifth aspect is implemented.

According to a twelfth aspect, the present disclosure provides an apparatus for determining a route leak. The apparatus includes hardware related to a program instruction, to implement the method according to any one of the first aspect to the fifth aspect or the possible embodiments of the first aspect to the fifth aspect.

According to a thirteenth aspect, the present disclosure provides a system. The system provides the network monitoring device provided in the sixth aspect, the routing device provided in the seventh aspect or the ninth aspect, and the routing device provided in the eighth aspect or the tenth aspect.

According to a fourteenth aspect, the present disclosure provides a network monitoring device. The network monitoring device manages a first autonomous system, and performs the method in any one of the first aspect or the possible implementations of the first aspect. Specifically, the network device includes a unit configured to perform the method in any one of the first aspect or the possible implementations of the first aspect.

According to a fifteenth aspect, the present disclosure provides a routing device. The routing device is a border node of a first autonomous system, and performs the method in any one of the second aspect to the fourth aspect or the possible implementation of the second aspect to the fourth aspect. Specifically, the network device includes a unit configured to perform the method in any one of the second aspect to the fourth aspect or the possible implementations of the second aspect to the fourth aspect.

BRIEF DESCRIPTION OF DRAWINGS

To describe the technical solutions in the present disclosure more clearly, the following briefly describes the accompanying drawings used in the embodiments. Apparently, the accompanying drawings in the following description merely show some embodiments of the present disclosure, and persons of ordinary skill in the art can derive other technical solutions and accompanying drawings from these accompanying drawings without creative efforts.

FIG. 4A-1 and FIG. 4A-2 are flowcharts of a method according to an embodiment of the present disclosure;

FIG. 4B-1 and FIG. 4B-2 are flowcharts of a method according to an embodiment of the present disclosure;

DESCRIPTION OF EMBODIMENTS

The following describes the embodiments of the present disclosure with reference to accompanying drawings.

Figure 1:
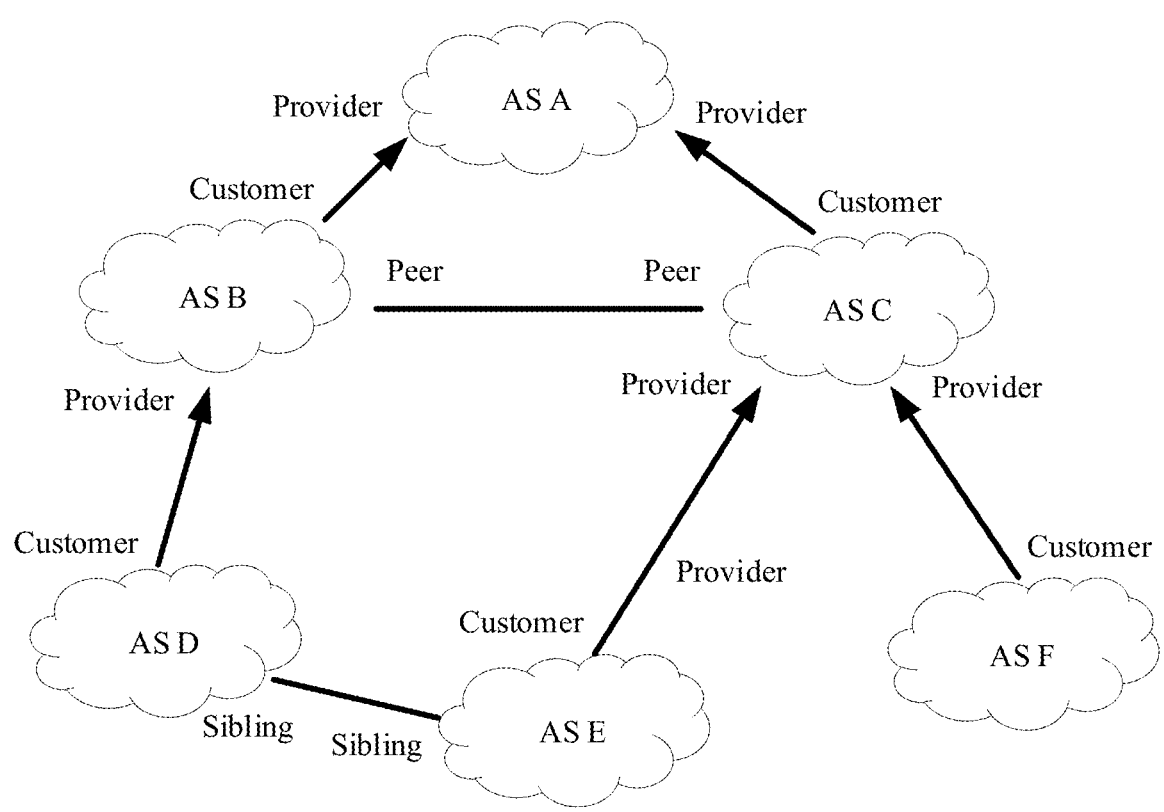
FIG. 1 is a block diagram of an inter-AS routing and switching business relationship of the international internet.

FIG. 1 is a block diagram of an inter-AS routing and switching business relationship of the international internet. Generally, connections between ASs on the international internet are mainly classified into three types:

Customer to provider, also referred to as C2P in this document, or provider to customer, also referred to as P2C in this document.

Peer to peer, also referred to as P2P in this document.

Sibling to sibling, also referred to as S2S in this document.

A customer pays a provider for an internet service, to form a C2P or P2C connection. P2P mutual access is usually free of charge. An S2S connection is usually used between different ASs of a same interest group (for example, a same carrier). The S2S connection is also free of charge.

It can be seen that scales and interests of different carriers are main factors that form a structure of the current international internet. To obtain more services, a small-sized carrier needs to pay a large-sized carrier for connections. Carriers of a same scale can establish a free peering connection through an agreement.

The foregoing connection relationships are implemented by controlling a routing policy.

Currently, a network administrator uses the routing policy to control route advertisement. When an AS receives a route advertised by another AS, a processing rule is as follows:

(1). A route advertised by a client AS can be transmitted to another client AS, a peer AS, and a provider AS.

(2). A route advertised by a peer AS can be transmitted to a client AS, but is not allowed to be transmitted to another peer AS and a provider AS.

(3). A route advertised by a provider AS can be transmitted to a client AS, but is not allowed to be transmitted to a peer AS and another provider AS.

If a route that is not allowed to be advertised is advertised, a route leak occurs. In this document, the route leak is the same as a route prefix leak. The route prefix leak means a route including a route prefix is leaked.

Figure 2:
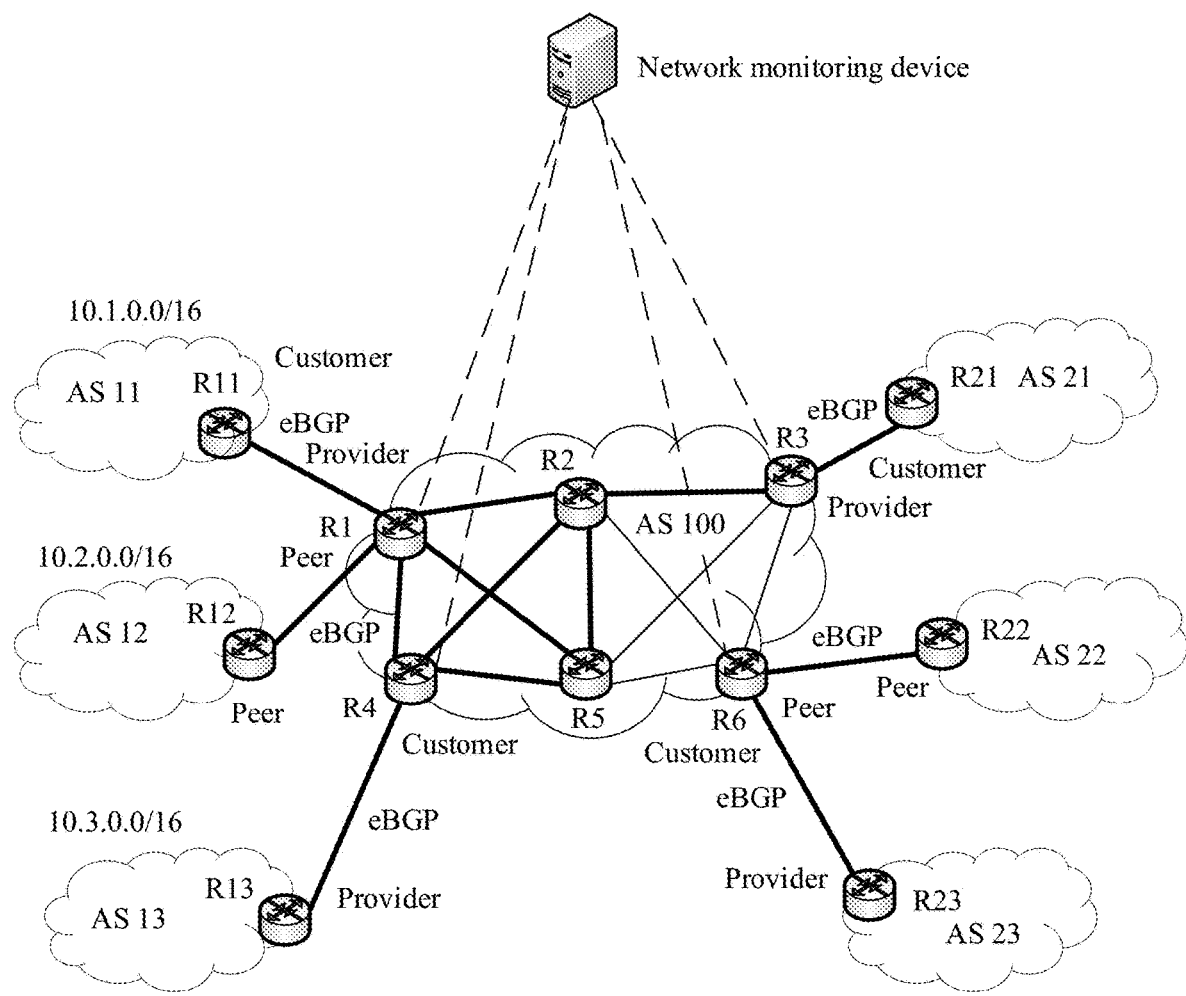
FIG. 2 is a block diagram of a scenario according to an embodiment of the present disclosure.

FIG. 2 is a block diagram of a scenario according to an embodiment of the present disclosure. The scenario includes an AS 100, an AS 11, an AS 12, an AS 13, an AS 21, an AS 22 and an AS 23. The AS 100 includes network nodes R1, R2, R3, R4, R5, and R6. R1, R3, R4, and R6 are border nodes of the AS 100, and R2 and R5 are internal nodes of the AS 100. A network monitoring device manages the AS 100. For example, the network monitoring device may be a BGP monitoring (BMP) server, a network management device, or a controller. A management domain of the network monitoring device includes the AS 100. Although FIG. 2 shows only the AS 100, the management domain of the network monitoring device may include a plurality of ASs, for example, an AS 100, an AS 101, and an AS 102.

The AS 100 is connected to a border node R11 of the AS 11 through R1. The AS 100 is connected to a border node R12 of the AS 12 through R1. The AS 100 is connected to a border node R21 of the AS 21 through R3. The AS 100 is connected to a border node R13 of the AS 13 through R4. The AS 100 is connected to the border node R21 of the AS 21 through R3. The AS 100 is connected to a border node R22 of the AS 22 through R6. The AS 100 is connected to a border node R23 of the AS 23 through R6. For example, R1 establishes an external BGP (eBGP) peer relationship with R11. R1 establishes an eBGP peer relationship with R12. R4 establishes an eBGP peer relationship with R13. R3 establishes an eBGP peer relationship with R21. R6 establishes an eBGP peer relationship with R22. R6 establishes an eBGP peer relationship with R23. The AS 11, the AS 12, the AS 13, the AS 21, the AS 22, and the AS 23 are peer ASs of the AS 100.

R1, R3, R4, and R6 separately establish a management channel connection with the network monitoring device. The network monitoring device obtains required information through the management channel connection. For example, the management channel connection may be a TCP connection. R1, R3, R4, and R6 communicate with the network monitoring device over a border gateway protocol monitoring protocol (BMP). R1, R3, R4, and R6 send BGP running status information to the network monitoring device through a BMP packet. The network monitoring device parses and analyzes the received BMP packet.

For example, the border node and the internal node are network devices having a routing function, for example, may be routers or layer 3 switches.

For example, the border node R11 of the AS 11 advertises a piece of routing information A to the border node R1 of the AS 100, for example, may advertise the routing information A through a BGP update message. The routing information A includes a route prefix 10.1.0.0/16. The border node R12 of the AS 12 advertises a piece of routing information B to the border node R1 of the AS 100. The routing information B includes a route prefix 10.2.0.0/16. The border node R13 of the AS 13 advertises a piece of routing information C to the border node R4 of the AS 100. The routing information C includes a route prefix 10.3.0.0/16. It is assumed that the routing information A, the routing information B, and the routing information C are separately transmitted to R6 through the internal node of the AS 100. Then, R6 advertises the routing information A, the routing information B, and the routing information C to the border node R22 of the AS 22. In this embodiment of the present disclosure, the foregoing case may also be referred to as the following. R1 receives the route prefix 10.1.0.0/16 from the AS 11, and sends 10.1.0.0/16 to the AS 22. R1 receives the route prefix 10.2.0.0/16 from the AS 12, and sends 10.2.0.0/16 to the AS 22. R1 receives the route prefix 10.3.0.0/16 from the AS 13, and sends 10.3.0.0/16 to the AS 22. Alternatively, the foregoing case may also be referred to as the following. A transfer path of the route prefix 10.1.0.0/16 sequentially includes the AS 11, the AS 100, and the AS 22. A transfer path of the route prefix 10.2.0.0/16 sequentially includes the AS 12, the AS 100, and the AS 22. A transfer path of the route prefix 10.3.0.0/16 sequentially includes the AS 13, the AS 100, and the AS 22.

For example, a network administrator may configure an export ("export" is for a sending direction of a route) policy for each border node of the AS 100 according to the route leaking rule in FIG. 1 and based on an attribute of a business relationship between the AS 100 and other ASs shown in FIG. 2. For example, the export policy of R6 can be configured as: "If a route from the AS 12 is received, the route cannot be sent to the AS 22". This configuration does not cause a route leak. However, if the export policy of R6 is configured as: "If a route from the AS 12 is received, the route can be sent to the AS 22". This causes the route leak.

According to the rule for determining the route leak shown in FIG. 1, if R1 receives the route prefix 10.1.0.0/16 from the AS 11 and sends the route prefix 10.1.0.0/16 to the AS 22, the route leak does not occur. If R1 receives the route prefix 10.2.0.0/16 from the AS 12 and sends the route prefix 10.2.0.0/16 to the AS 22, the route leak occurs. If R4 receives the route prefix 10.3.0.0/16 from the AS 13 and sends the route prefix 10.3.0.0/16 to the AS 22, the route leak occurs.

In the prior art, there is no effective means to check whether the route leak occurs.

Embodiments of the present disclosure provide a method, device, and system for determining a route leak. The network management device receives an extended BMP message separately sent by an ingress border node (receiving a route prefix) and an egress border node (sending the route prefix) that are of an autonomous system managed by the network management device, to determine a receiving relationship and a sending relationship of the route prefix. Therefore, it can be determined whether the route prefix is leaked. The method, the device, and the system are based on a same inventive concept. Because problem-resolving principles of the method, the device, and the system are similar, mutual reference may be made between implementation of the device and implementation of the method, and mutual reference may also be made between implementation of the system and the implementation of the method. Repeated descriptions are omitted.

In a prior-art BMP, a BMP session includes messages, such as an initiation message, a peer up notification, a route monitoring message, a peer down notification, a state report, and a termination message. These messages are sent in a form of packets. Reported information includes BGP routing information, BGP peer information, vendor information and a version number of a router, and the like.

TABLE 1

BMP message

| BMP message type | Message description and function |
| --- | --- |
| Initiation message | A BMP protocol initiation message is used to notify a network monitoring device of vendor information, a version number, and the like |
| Peer up notification | Report establishment information about a BGP peer connection to a network monitoring device (Up) |
| Route monitoring | A route monitoring message is used to send all routes received from or sent to a peer to a network monitoring device, and report addition or withdrawal of routes to the network monitoring device at any time |
| Peer down notification | Report interruption of a BGP peer connection to a network monitoring device (Down) |
| Stats reports | Report statistics about a running status of a router to a network monitoring device |
| Termination message | A termination message is used to notify a network monitoring device of a reason for closing a BMP session |

Figure 3A:
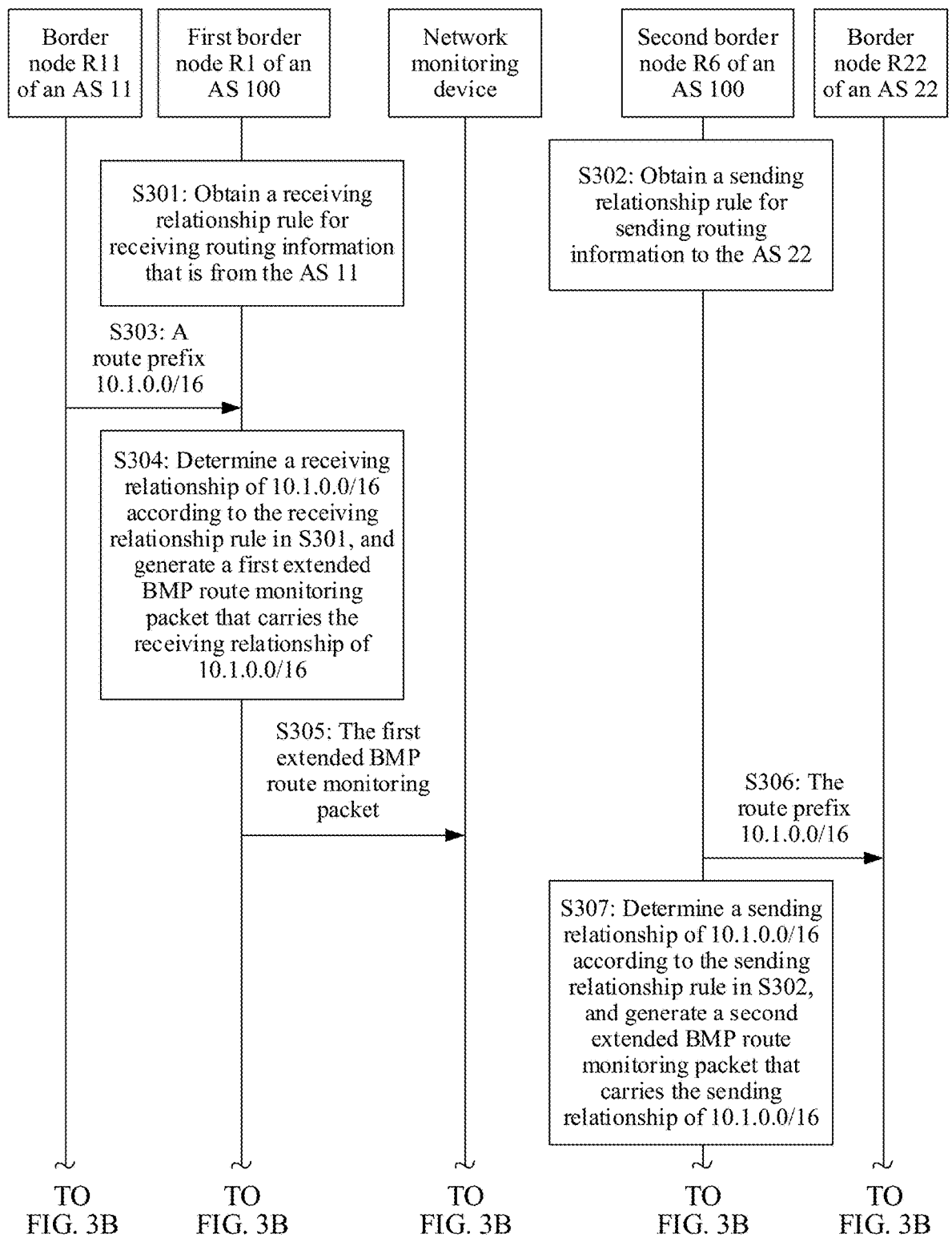
FIG. 3A and FIG. 3B are flowcharts of a method according to an embodiment of the present disclosure.
Figure 3B:
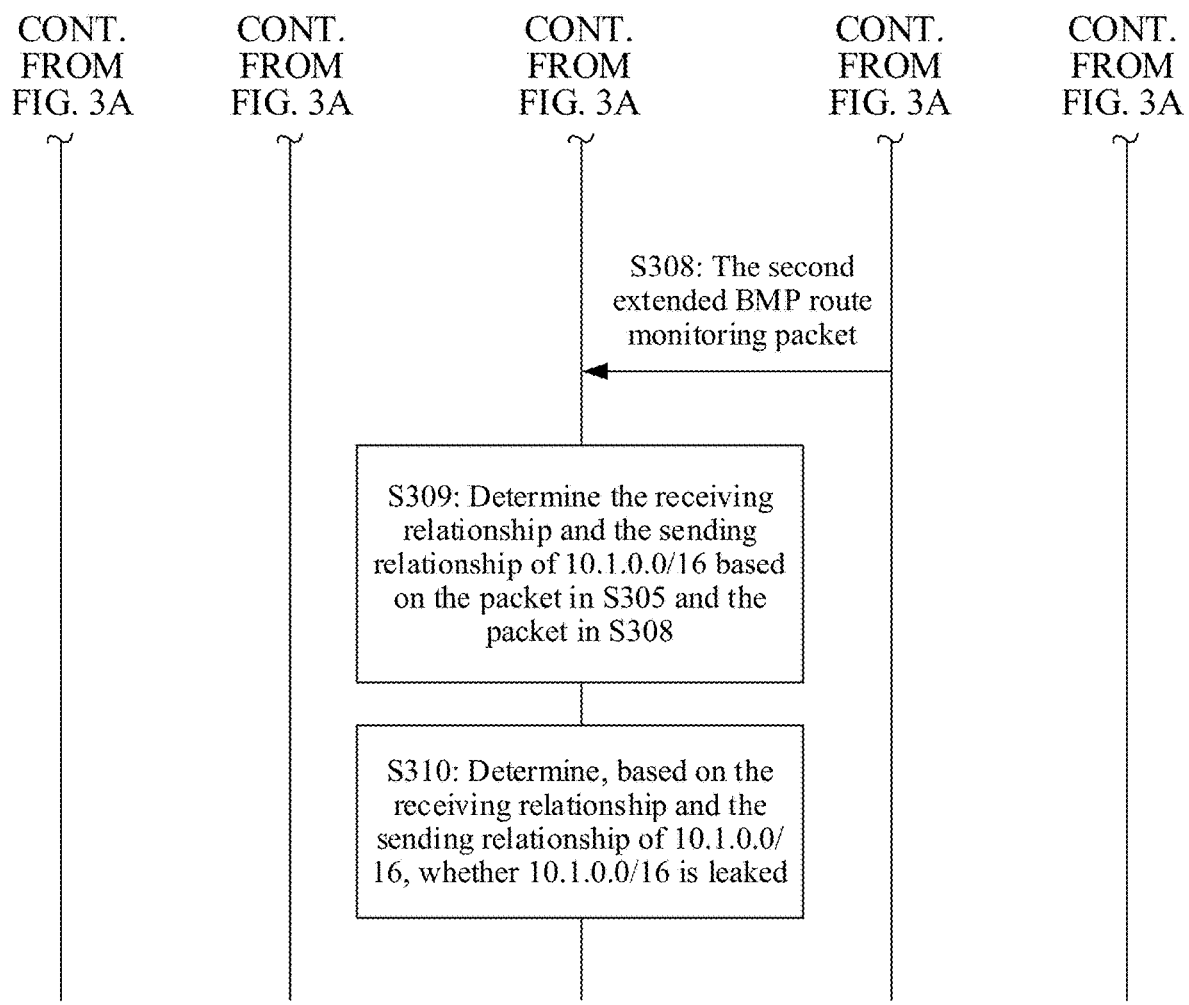

With reference to the scenario shown in FIG. 2, FIG. 3A and FIG. 3B are a block flowchart of a method according to an embodiment of the present disclosure. For ease of description, an example is as follows.

A network monitoring device in FIG. 3A and FIG. 3B may be the controller or the BMP server in FIG. 2, and manages the AS 100. A first autonomous system in FIG. 3A and FIG. 3B may be the AS 100 in FIG. 2. A second autonomous system in FIG. 3A and FIG. 3B may be the AS 11 in FIG. 2. A third autonomous system in FIG. 3A and FIG. 3B may be the AS 22 in FIG. 2. A first border node in FIG. 3A and FIG. 3B may be R1 in FIG. 2. A second border node in FIG. 3A and FIG. 3B may be R6 in FIG. 2.

S301: A first border node obtains a receiving relationship rule for receiving routing information that is from a second autonomous system.

In one embodiment, a network administrator may configure, on the first border node (R1) of the first autonomous system, the receiving relationship rule for R1 to receive the routing information from the second autonomous system (AS 11). Therefore, R1 may obtain the receiving relationship rule. The receiving relationship rule may be receiving based on a C2P relationship, receiving based on a P2P relationship, or receiving based on a P2C relationship.

In one embodiment, the receiving relationship rule may be configured based on a granularity of a peer autonomous system. As shown in FIG. 2, peer autonomous systems corresponding to R1 are the AS 11 and the AS 12. R1 may be configured to receive all routing information from the AS 11 based on the C2P relationship, and to receive all routing information from the AS 12 based on the P2P relationship.

In one embodiment, the receiving relationship rule may be configured based on a granularity of a route prefix. For example, R1 may be configured to receive a route prefix x.x.0.0/16 from the AS 11 based on the C2P relationship and a route prefix x.y.0.0/16 from the AS 11 based on the P2C relationship. x and y herein indicate any valid numbers that comply with a route prefix coding rule.

In one embodiment, configuration of the granularity of the route prefix and configuration of the granularity of the peer autonomous system may coexist. The configuration of the granularity of the route prefix has a higher priority. For example, two rules of the granularity of the route prefix may be configured for the routing information sent from the AS 11. R1 receives the route prefix x.x.0.0/16 from the AS 11 based on the C2P relationship. R1 receives the route prefix x.y.0.0/16 from the AS 11 based on the P2C relationship. In addition, a rule of the granularity of the peer autonomous system is configured, and R1 receives the route prefix from the AS 11 based on the C2P relationship.

S302: A second border node obtains a sending relationship rule for sending routing information to a third autonomous system.

The second border node (R6) obtains the sending relationship rule for sending the routing information to the third autonomous system (AS 22). The sending relationship rule may be sending based on the C2P relationship, sending based on the P2P relationship, or sending based on the P2C relationship. For a specific obtaining manner, refer to the description in S301. Details are not described herein again.

S303: The first border node receives routing information that is sent by the second autonomous system and that includes a route prefix 10.1.0.0/16.

For example, the border node R11 of the AS 11 advertises the routing information including the route prefix 10.1.0.0/16 through a BGP update message. Therefore, R1 receives the routing information.

S304: The first border node generates a first extended BMP route monitoring packet, where the first extended BMP route monitoring packet carries a receiving relationship of the route prefix that has been received by the first border node from the second autonomous system. The receiving relationship of the route prefix is a business relationship between a sender AS of the route prefix and a receiver AS of the route prefix when a border node of the receiver AS receives the route prefix. Specifically, in this example, information carried in the packet indicates that "the receiving relationship of the route prefix 10.1.0.0/16 received by R1 from the AS 11 is C2P", to be specific, when the route prefix 10.1.0.0/16 is received by R1, as the receiver, a business relationship identity of the AS 100 on which R1 is located is a provider, and as the sender of 10.1.0.0/16, a business relationship identity of the AS 11 is a customer.

For example, R1 determines the receiving relationship of 10.1.0.0/16 according to the receiving relationship rule obtained in the operation S301.

For example, if the receiving relationship rule is of the granularity of the peer autonomous system, and content is receiving based on the C2P relationship, the receiving relationship of 10.1.0.0/16 is determined as C2P. If the receiving relationship rule is of both the granularity of the route prefix and the granularity of the peer autonomous system, the granularity of the route prefix has a higher priority.

According to a BMP protocol, R1 sends a BMP route monitoring packet to the network monitoring device after S303 is performed. The packet includes a common header, a per-peer header, and a BGP update protocol data unit (BGP Update PDU).

In this embodiment, the BMP route monitoring packet in the existing protocol is extended, and is referred to as the extended BMP route monitoring packet. Therefore, the BMP route monitoring packet may carry the information that "the receiving relationship of the route prefix 10.1.0.0/16 received by R1 from the AS 11 is C2P".

For a specific carrying manner, in one embodiment, a peer AS field included in the per-peer header carries information about the second autonomous system. An '0' bit in the per-peer header is used to indicate "receiving" or "sending".

A BGP update PDU in the per-peer header carries the received route prefix, and an extended field carries the receiving relationship.

Specifically, in this example, the peer AS field in the per-peer header carries information about the AS 22. The '0' bit in the per-peer header indicates "receiving". The BGP update PDU in the per-peer header carries 10.1.0.0/16. For the receiving relationship carried in the extended field, for example, the extended field may carry the receiving relationship in a type-length-value manner.

A possible manner is as follows:

A value of a type field being 1 indicates a relationship between a route prefix source AS and a local AS, a value of a value field being 1 indicates C2P, the value of the value field being 2 indicates P2P, and the value of the value field being 3 indicates P2C.

Specifically, in this example, if the receiving relationship of 10.1.0.0/16 is C2P, the value of the type field is 1, and the value of the value field is 1.

In another possible manner, the value of the type field being 3 indicates information about a relationship between ASs, and a format of the value field may be (a sender AS, a receiver AS, a business relationship). Values 1, 2, and 3 of the business relationship indicate C2P, P2P, and P2C respectively. Specifically, in this example, the value of the type field is 3, and the value of the value field is (information about the AS 11, information about the AS 100, 1).

It may be understood that the value of the type field is 1, 2, or 3. The value of the value field is 1, 2, or 3. This is merely an example, and may also be another value. This is not limited herein.

The foregoing provides several manners in which the BMP route monitoring packet is extended in the existing protocol, so that the BMP route monitoring packet can carry the information that "the receiving relationship of the route prefix 10.1.0.0/16 received by R1 from the AS 11 is C2P". It should be understood that another extension manner may also be used to achieve a same objective.

S305: The first border node sends the first extended BMP route monitoring packet to a network monitoring device. The network monitoring device receives the first extended BMP route monitoring packet.

S306: The second border node sends the routing information including the route prefix 10.1.0.0/16 to the third autonomous system.

For example, after S305 is performed, the routing information including the route prefix 10.1.0.0/16 is transferred to the second border node R6 through internal nodes of the AS 100. Then, R6 advertises the routing information including the route prefix 10.1.0.0/16 to the third autonomous system (AS 22) through the BGP update message.

S307: The second border node generates a second extended BMP route monitoring packet, where the second extended BMP route monitoring packet carries a sending relationship of the route prefix that has been sent by the second border node to the third autonomous system. The sending relationship of the route prefix is a business relationship between a sender AS of the route prefix and a receiver AS of the route prefix when a border node of the sender AS of the route prefix sends the route prefix to the receiver AS. Specifically, in this example, information carried in the packet indicates that "the sending relationship of the route prefix 10.1.0.0/16 sent by R6 to the AS 22 is P2P", to be specific, when the border node R6 of the AS 100 sends the route prefix 10.1.0.0/16 to the AS 22, as the sender, the business relationship identity of the AS 100 is a peer, and as the receiver, a business relationship identity of the AS 22 is a peer.

For how R6 generates the second extended BMP route monitoring packet, refer to the description in the extended field in S304. In the extended field type-length-value, type=2 indicates a relationship between a local AS and a destination AS to which the route prefix is sent, the value of the value field being 1 indicates C2P, the value of the value field being 2 indicates P2P, and the value of the value field being 3 indicates P2C. Specifically, in this example, if the sending relationship of 10.1.0.0/16 is P2P, the value of the type field is 2, and the value of the value field is 2.

Alternatively, a manner of type=3 in S304 may also be used.

It may be understood that the value of the type field is 1, 2, or 3. The value of the value field is 1, 2, or 3. This is merely an example, and may also be another value. This is not limited herein.

S308: The second border node sends the second extended BMP route monitoring packet to the network monitoring device. The network monitoring device receives the second extended BMP route monitoring packet.

S309: The network monitoring device determines, based on the receiving relationship carried in the received first extended BMP route monitoring packet and the sending relationship carried in the received second extended BMP route monitoring packet, that the receiving relationship of the route prefix 10.1.0.0/16 received by R1 from the AS 11 is C2P, and the sending relationship of the route prefix 10.1.0.0/16 sent by R6 to the AS 22 is P2P.

Because the first extended BMP route monitoring packet and the second extended BMP route monitoring packet carry related information, the network monitoring device may determine the information.

S310: The network monitoring device determines, based on the determined receiving relationship and the determined sending relationship, whether the route prefix is leaked.

For example, the network monitoring device may determine, according to the following route leak determining rule, whether the route prefix is leaked:

If the receiving relationship is the peer-to-peer relationship, and the sending relationship is the peer-to-peer relationship, it is determined that the route prefix is leaked; or if the receiving relationship is the peer-to-peer relationship, and the sending relationship is the client-to-provider relationship, it is determined that the route prefix is leaked; or if the receiving relationship is the provider-to-client relationship, and the sending relationship is the peer-to-peer relationship, it is determined that the route prefix is leaked; or if the receiving relationship is the provider-to-client relationship, and the sending relationship is the client-to-provider relationship, it is determined that the route prefix is leaked.

Specifically, in this example, the receiving relationship of the route prefix 10.1.0.0/16 is C2P, and the sending relationship is P2P. Therefore, the route prefix 10.1.0.0/16 is not leaked. The network monitoring device associates information of the first extended BMP route monitoring packet and the second extended BMP route monitoring packet based on that the two packets include a same route prefix 10.1.0.0/16.

The network monitoring device determines, based on an extended BMP route monitoring packet sent by each border node of the AS 100, whether a route leak occurs in the AS 100. With reference to FIG. 2, Table 2 shows an example in which route prefixes are sent by R6 to the AS 22, and the network monitoring device determines whether the route leak occurs in the AS 100 and which route prefixes are leaked.

TABLE 2

Network monitoring device determines whether a route prefix sent from R6 to an AS 22 is leaked

| Route prefix | Receiving relationship | Sending relationship | Source AS | Local AS | Destination AS | Leaked or not |
|---|---|---|---|---|---|---|
| 10.1.0.0/16 | C2P | P2P | AS 11 | AS 100 | AS 22 | No |
| 10.2.0.0/16 | P2P | P2P | AS 12 | AS 100 | AS 22 | Yes |
| 10.3.0.0/16 | P2C | P2P | AS 13 | AS 100 | AS 22 | Yes |

The network monitoring device may learn, in a plurality of manners, that the AS 100 is the local AS in Table 1. For example, after R1 establishes an eBGP peer relationship with R11, R1 sends a BMP peer up notification packet to the network monitoring device according to the BMP protocol. The BMP peer up notification packet carries the information about the local AS (AS 100) and the information about the peer AS (AS 11). Therefore, the network monitoring device learns that R1 is a border node of the AS 100. After subsequently receiving the first extended BMP route monitoring packet sent by R1, the network monitoring device may determine, through analysis, that the AS 100 receives the route prefix 10.1.0.0/16.

For another example, if the manner of type=3 in S304 is used in the first extended BMP route monitoring packet, the network monitoring device may also learn that 10.1.0.0/16 is sent by the AS 11 to the AS 100. In this way, with reference to the second extended BMP route monitoring packet sent by R6, it may be learned that 10.1.0.0/16 is sent by the AS 100 to the AS 22. Therefore, the network monitoring device combines, according to 10.1.0.0/16, information in the first extended BMP route monitoring packet and information in the second extended BMP route monitoring packet, and may obtain 10.1.0.0/16 through analysis.

In the foregoing operations, an action of R1 may be independent of an action of R6, and R6 may not be performed later than R1. In addition, a sequence of S306 may interchange with a sequence of S307.

In the embodiment corresponding to FIG. 3A and FIG. 3B, the receiving relationship and the sending relationship are carried by extending the BMP route monitoring packet. Compared with the embodiments shown in FIG. 4A-1 and FIG. 4A-2 and FIG. 4B-1 and FIG. 4B-2, the network monitoring device may directly obtain the receiving relationship and the sending relationship of 10.1.0.0/16 from the extended BMP route monitoring packet. There is no need to analyze the BMP peer up notification packet to determine whether 10.1.0.0/16 is leaked.

Figures 1, 4A:
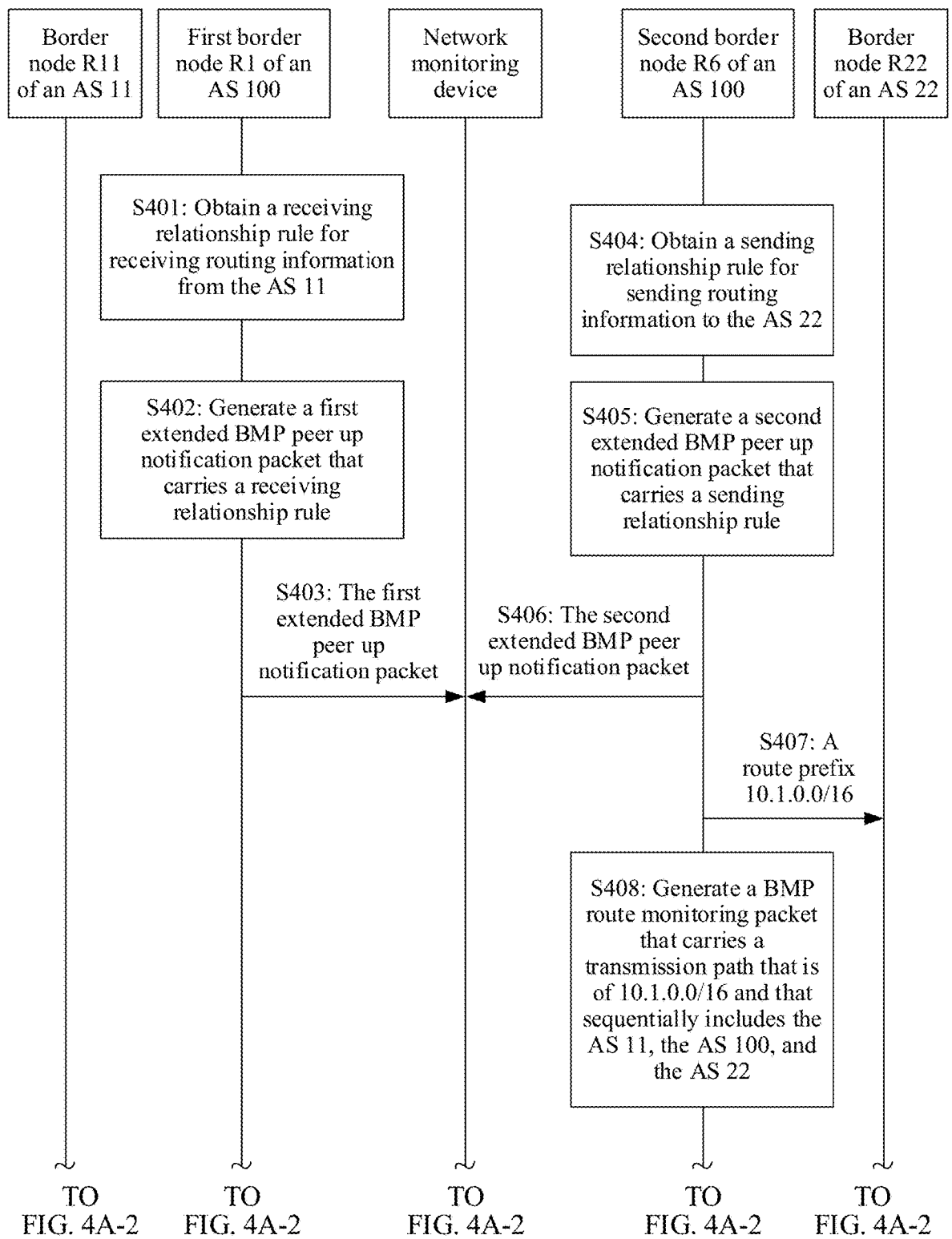
Figures 2, 4A:
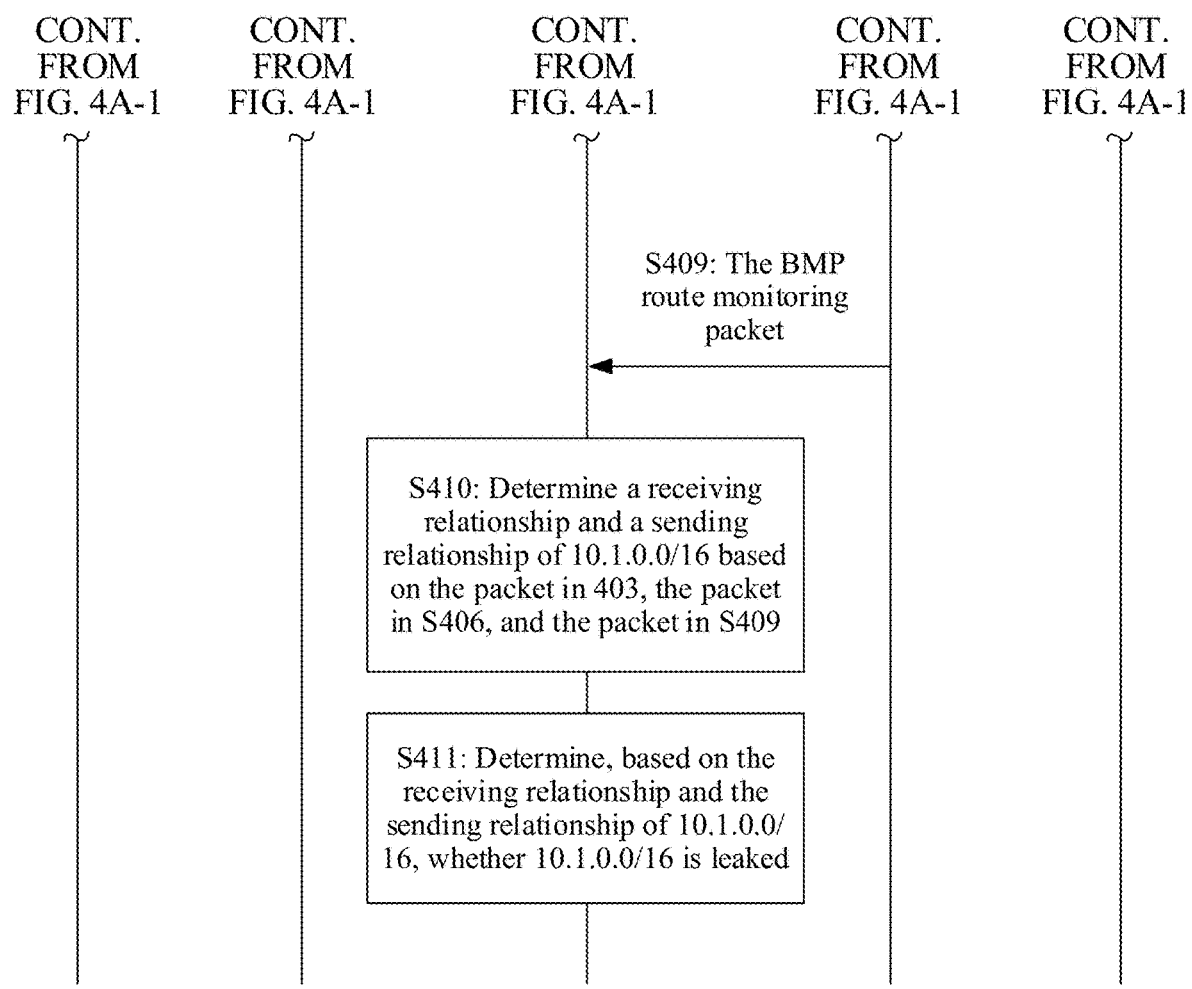

With reference to the scenario shown in FIG. 2, FIG. 4A-1 and FIG. 4A-2 are a block flowchart of a method according to an embodiment of the present disclosure. For ease of description, an example in FIG. 4A-1 and FIG. 4A-2 is similar to that in the embodiment in FIG. 3A and FIG. 3B. Different from FIG. 3A and FIG. 3B, in the embodiment corresponding to FIG. 4A-1 and FIG. 4A-2, a BMP peer up notification packet is extended. R1 carries, in a BMP peer up notification packet sent to a network monitoring device, the receiving relationship rule described in the embodiment in FIG. 3A and FIG. 3B. R6 carries, in a BMP peer up notification packet sent to the network monitoring device, the receiving relationship rule described in the embodiment in FIG. 3A and FIG. 3B. After the network monitoring device receives the BMP route monitoring packet sent by R6, because a transmission path of 10.1.0.0/16 carried in the BMP route monitoring packet sequentially includes an AS 11, an AS 100, and an AS 22, the network monitoring device may combine information in the three packets. The network monitoring device determines that a receiving relationship of the route prefix 10.1.0.0/16 received by R1 from the AS 11 is C2P, and that a sending relationship of the route prefix 10.1.0.0/16 sent by R6 to the AS 22 is P2P, to determine whether a route leak occurs.

S401: A first border node obtains a receiving relationship rule for receiving routing information from a second autonomous system.

Refer to the description in S301 in FIG. 3A and FIG. 3B.

S402: The first border node generates a first extended BMP peer up notification packet, where the first extended BMP peer up notification packet carries the receiving relationship rule obtained in S401.

For example, the receiving relationship rule is that "all routing information received by R1 from the AS 11 is received based on the C2P relationship". Because the peer up notification packet includes a common header and a per-peer header, in a possible manner, the same manner in S304 may be used. In an extended field, the receiving relationship rule may be carried in a type-length-value manner.

S403: The first border node sends the first extended BMP peer up notification packet to a network monitoring device, and the network monitoring device receives the first extended BMP peer up notification packet.

S404: A second border node obtains a sending relationship rule for sending routing information to a third autonomous system.

Refer to the description in S302 in FIG. 3A and FIG. 3B.

S405: The second border node generates a second extended BMP peer up notification packet, where the second extended BMP peer up notification packet carries the sending relationship rule obtained in S404. Refer to the packet extension manner in S307.

S406: The second border node sends the second extended BMP peer up notification packet to the network monitoring device, and the network monitoring device receives the second extended BMP peer up notification packet.

S407: The second border node sends routing information including a route prefix 10.1.0.0/16 to the third autonomous system.

Refer to S306.

S408: The second border node generates a BMP route monitoring packet.

After S407 is performed, R6 generates the BMP route monitoring packet according to the existing BMP protocol. The BMP route monitoring packet includes BGP routing information sent by R6 to the AS 22. Refer to an example in Table 3.

TABLE 3

| BGP routing information sent by R6 to an AS 22: | |
|---|---|
| Prefix | AS path |
| 10.1.0.0/16 | AS-path: 100 11 |
| 10.2.0.0/16 | AS-path: 100 12 |
| 10.3.0.0/16 | AS-path: 100 13 |

Table 3 shows that a BGP route sent by R6 to the AS 22 sequentially passes through the AS 11 and the AS 100. Information about the AS 22 may be carried in a peer AS field in a per-peer header of the BMP route monitoring packet. Therefore, the BMP route monitoring packet generated by R6 may indicate that the transmission path of the route prefix 10.1.0.0/16 sequentially includes the AS 11, the AS 100, and the AS 22.

S409: The second border node sends the BMP route monitoring packet to the network monitoring device. The network monitoring device receives the BMP route monitoring packet sent by the second border node.

S410: The network monitoring device may determine, according to the receiving relationship rule ("R1 receives the route prefix 10.1.0.0/16 from the AS 11 based on a C2P relationship") carried in the received first extended BMP peer up notification packet, the sending relationship rule ("R6 sends the route prefix 10.1.0.0/16 to the AS 22 based on a P2P relationship") carried in the received second extended BMP peer up notification packet, and a transfer path of the route prefix ("The transfer path of the route prefix 10.1.0.0/16 sequentially includes the AS 11, an AS 100, and the AS 22") carried in the received BMP route monitoring packet, that a receiving relationship of the route prefix 10.1.0.0/16 received by R1 from the AS 11 is C2P, and a sending relationship of the route prefix 10.1.0.0/16 sent by R6 to the AS 22 is P2P, namely, the receiving relationship and the sending relationship mentioned in S304 and S307. It may be understood that when the network monitoring device determines the receiving relationship and the sending relationship, the network monitoring device knows that R1 and R6 are border nodes of the AS 100.

S411: The network monitoring device determines, based on the determined receiving relationship and the determined sending relationship, whether the route prefix is leaked. For details, refer to S310.

In the foregoing operations S401 to S411, an action of R1 may be independent of an action of R6, and R6 may not be performed later than R1. A sequence of S407 may interchange with a sequence of S408.

In the embodiment corresponding to FIG. 4A-1 and FIG. 4A-2, by extending the BMP peer up notification packet to carry the receiving relationship rule and the sending relationship rule, it may be avoided to carry the receiving relationship and the sending relationship in each BMP route monitoring packet. Because the BMP peer up notification packet is sent once when a BGP peer relationship is established, and the BMP route monitoring packet is triggered each time a border node receives or sends routing information. The embodiment in FIG. 4A-1 and FIG. 4A-2 can reduce repeated carrying of business relationship information. In addition, the network monitoring device may monitor only a BMP route monitoring packet sent by an egress border node. This reduces monitoring workload.

Figures 1, 4B:
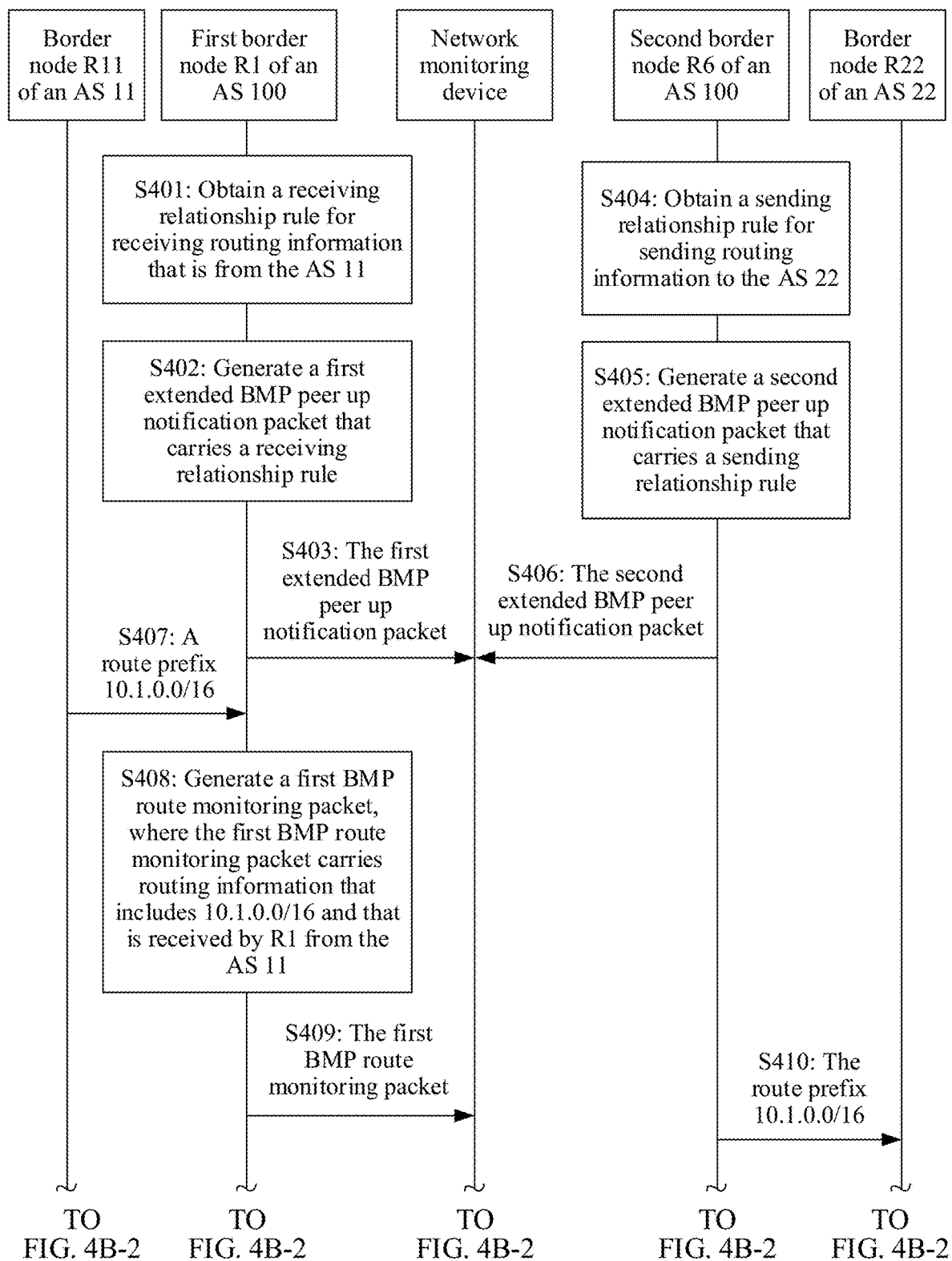
Figures 2, 4B:
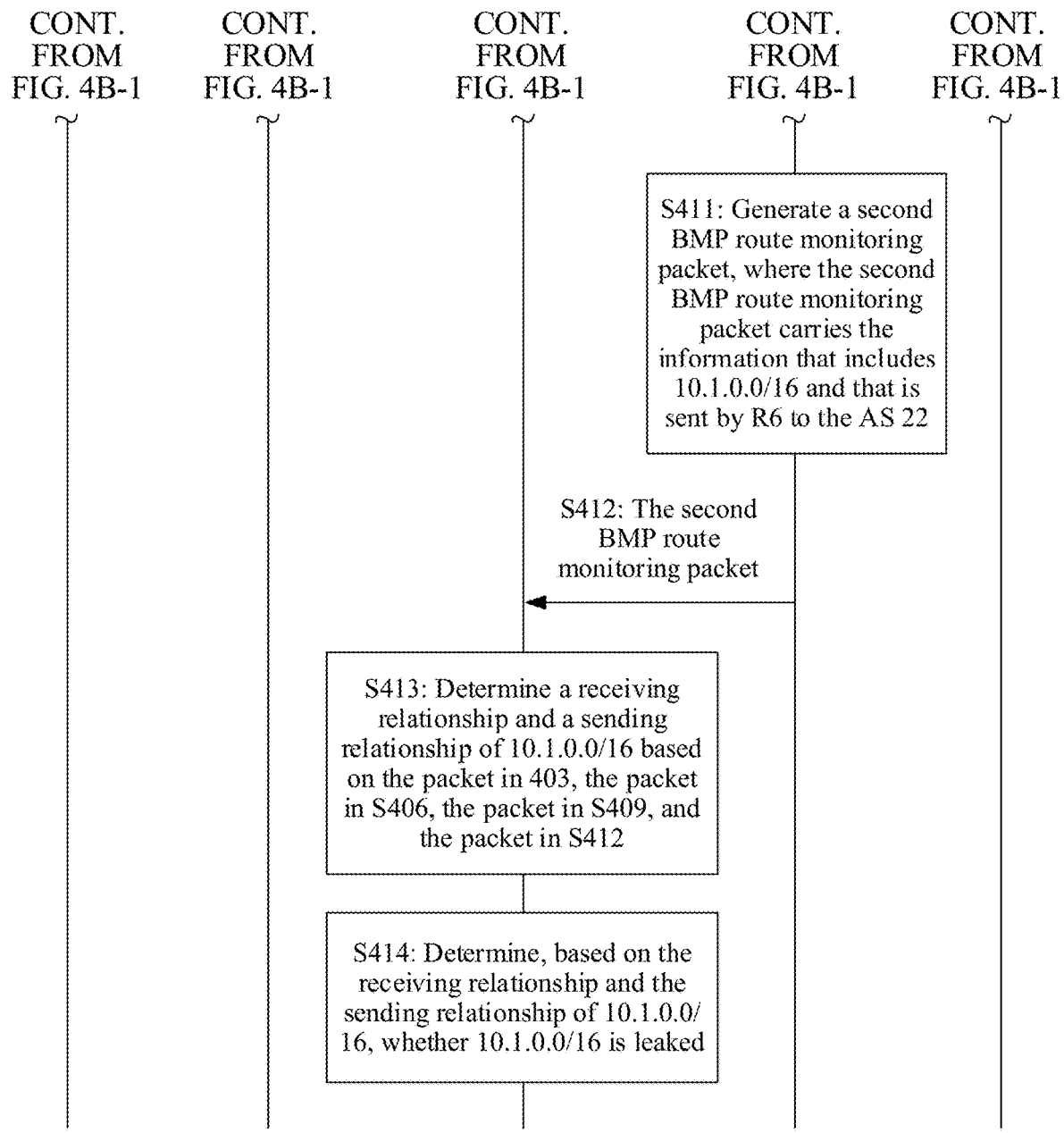

With reference to the scenario shown in FIG. 2, FIG. 4B-1 and FIG. 4B-2 are a block flowchart of a method according to an embodiment of the present disclosure. For ease of description, in both FIG. 4B-1 and FIG. 4B-2 and FIG. 4A-1 and FIG. 4A-2, the receiving relationship rule and the sending relationship rule are carried by extending the BMP peer up notification packet. A difference is that the network monitoring device determines, based on the first extended BMP peer up notification packet and a first BMP route monitoring packet that are sent by R1, and the second extended BMP peer up notification packet and a second BMP route monitoring packet that are sent by R6, the receiving relationship and the sending relationship of the route prefix. Continue from S406 in FIG. 4A:

S407: The first border node receives routing information that is sent by the second autonomous system and that includes a route prefix 10.1.0.0/16.

S408: The first border node generates a first BMP route monitoring packet corresponding to S407, where the first BMP route monitoring packet carries the routing information that includes the route prefix 10.1.0.0/16 and that is received by R1 from the AS 11.

S409: The first border node sends the first BMP route monitoring packet to the network monitoring device. The network monitoring device receives the first BMP route monitoring packet.

S410: The second border node sends the routing information including the route prefix 10.1.0.0/16 to the third autonomous system.

S411: The second border node generates a second BMP route monitoring packet corresponding to S410, where the second BMP route monitoring packet carries the routing information that includes the route prefix 10.1.0.0/16 and that is sent by R6 to the AS 22.

S412: The second border node sends the second BMP route monitoring packet to the network monitoring device. The network monitoring device receives the second BMP route monitoring packet.

S413: The network monitoring device may determine, based on information carried in the four received packets, that a receiving relationship of the route prefix 10.1.0.0/16 received by R1 from the AS 11 is C2P, and a sending relationship of the route prefix 10.1.0.0/16 sent by R6 to the AS 22 is P2P, namely, the receiving relationship and the sending relationship mentioned in S304 and S307.

S414: The network monitoring device determines, based on the determined receiving relationship and the determined sending relationship, whether the route prefix is leaked. For details, refer to S310.

Compared with FIG. 4A-1 and FIG. 4A-2, in the embodiment in FIG. 4B-1 and FIG. 4B-2, the network monitoring device can also determine whether the route prefix is leaked without depending on transmission path information of a BMP route monitoring packet of an AS.

In one embodiment, for the embodiments shown in FIG. 3A and FIG. 3B, FIG. 4A-1 and FIG. 4A-2, and FIG. 4B-1 and FIG. 4B-2, after determining that the route leak occurs in the route prefix, the network monitoring device outputs alarm information. The alarm information indicates that the route prefix is leaked from the first autonomous system to the third autonomous system. For example, after determining that the route prefixes 10.2.0.0/16 and 10.3.0.0/16 are leaked, the network monitoring device outputs alarm information. The alarm information indicates that the route prefixes 10.2.0.0/16 and 10.3.0.0/16 are leaked from the AS 100 to the AS 22. In this way, the network administrator can promptly check import policies and export policies of both R1 and R6, to find faulty policy configuration.

Figure 5:
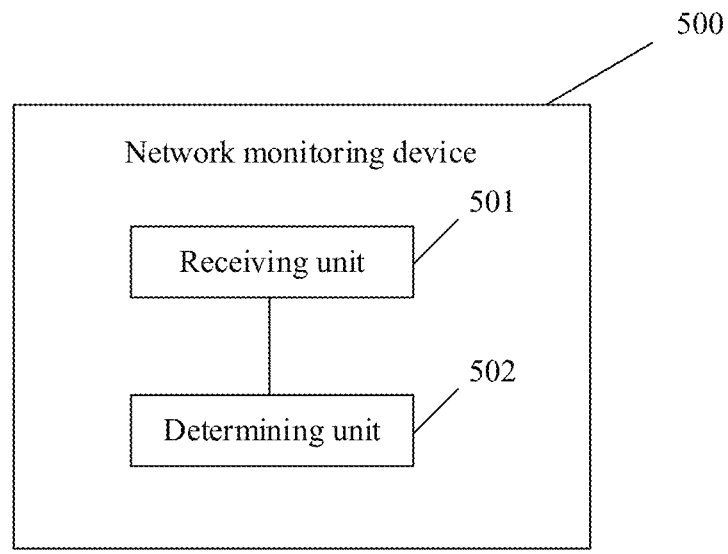
FIG. 5 is a block diagram of a network monitoring device according to an embodiment of the present disclosure.

FIG. 5 is a possible block diagram of a network monitoring device related in the foregoing method embodiments. The network monitoring device 500 may implement functions of the network monitoring device in the embodiments shown in FIG. 3A and FIG. 3B, FIG. 4A-1 and FIG. 4A-2, or FIG. 4B-1 and FIG. 4B-2. Referring to FIG. 5, the network monitoring device 500 includes a receiving unit 501 and a determining unit 502. These units may perform corresponding functions of the network monitoring device in the foregoing method embodiments. The receiving unit 501 is configured to support the network monitoring device 500 in performing S305, S308, S403, and S406 in the processes in FIG. 3A and FIG. 3B, FIG. 4A-1 and FIG. 4A-2, and FIG. 4B-1 and FIG. 4B-2, S409 in FIG. 4A-1 and FIG. 4A-2, and S409 and S412 in FIG. 4B-1 and FIG. 4B-2. The determining unit 502 is configured to support the network monitoring device 500 in performing S309, S301, S410, S411, S413, and S414 in FIG. 3A and FIG. 3B, FIG. 4A-1 and FIG. 4A-2, and FIG. 4B-1 and FIG. 4B-2. For a specific execution process, refer to the detailed descriptions of corresponding operations in the foregoing embodiments shown in FIG. 3, FIG. 4A-1 and FIG. 4A-2, and FIG. 4B-1 and FIG. 4B-2. Details are not described herein again. In one embodiment, the network monitoring device 500 may further include a sending unit, configured to output alarm information after the network monitoring device 500 determines that a route leak occurs in a route prefix. The alarm information indicates that the route prefix is leaked from a first autonomous system to a third autonomous system.

Figure 6:
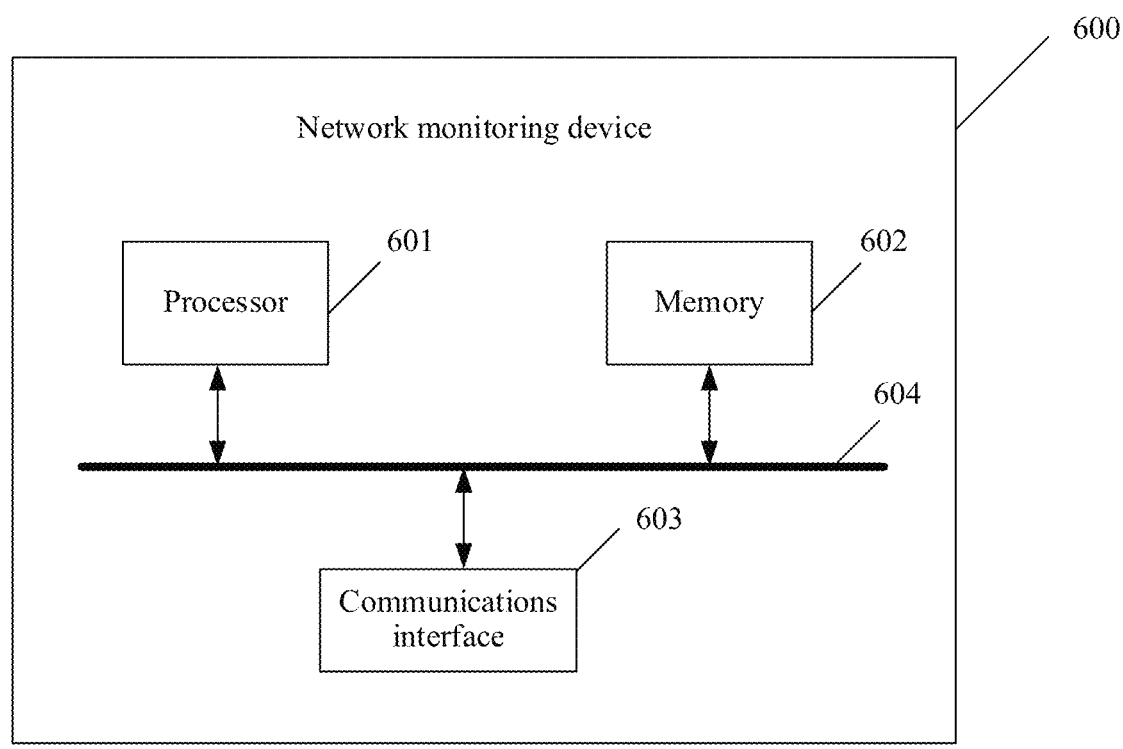
FIG. 6 is a block diagram of a network monitoring device according to an embodiment of the present disclosure.

FIG. 6 is a possible block diagram of a network monitoring device 600 related in the foregoing method embodiments. The network monitoring device 600 includes a processor 601, a memory 602, a communications interface 603, and a bus 604. The processor 601, the communications interface 603, and the memory 602 are connected to each other through the bus 604. The bus 604 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of representation, only one thick line is used to represent the bus in FIG. 6, but this does not mean that there is only one bus or only one type of bus. The network monitoring device 600 may implement functions of the network monitoring device in the embodiments shown in FIG. 3A and FIG. 3B, FIG. 4A-1 and FIG. 4A-2, or FIG. 4B-1 and FIG. 4B-2. The communications interface 603 is configured to support performing S305, S308, S403 and S406 in the processes in FIG. 3A and FIG. 3B, FIG. 4A-1 and FIG. 4A-2, and FIG. 4B-1 and FIG. 4B-2, S409 in FIG. 4A-1 and FIG. 4A-2, and 409 and S412 in FIG. 4B-1 and FIG. 4B-2. The processor 601 is configured to store a computer program. The computer program includes a program instruction. The processor 601 is configured to invoke the program instruction to perform S309, S301, S410, S411, S413, and S414 in FIG. 3A and FIG. 3B, FIG. 4A-1 and FIG. 4A-2, and FIG. 4B-1 and FIG. 4B-2. In one embodiment, the communications interface 603 is further configured to output alarm information after determining that a route leak occurs in a route prefix. The alarm information indicates that the route prefix is leaked from a first autonomous system to a third autonomous system.

Figure 7:
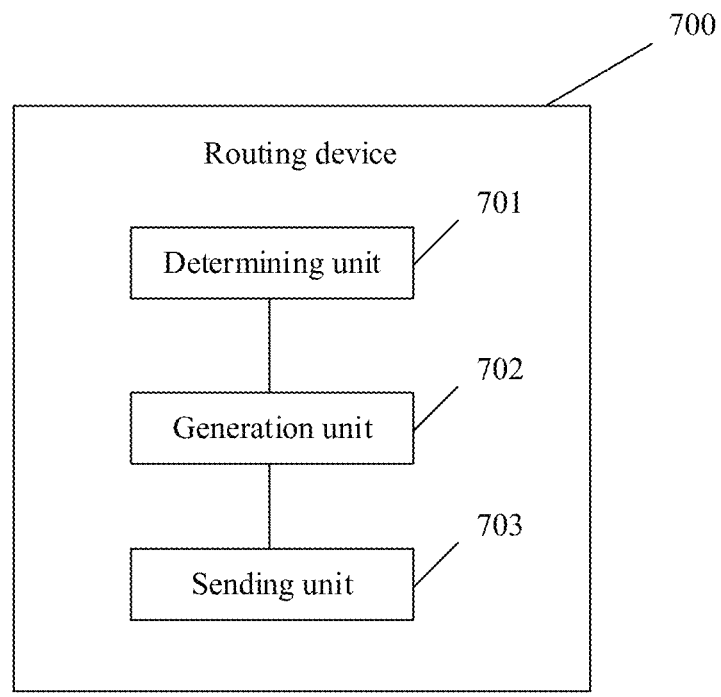
FIG. 7 is a block diagram of a routing device according to an embodiment of the present disclosure.

FIG. 7 is a possible block diagram of a first border node related in the embodiment in FIG. 3A and FIG. 3B. The first border node may be a routing device 700, and the routing device 700 includes a determining unit 701, a generation unit 702, and a sending unit 703. The determining unit 701 may perform a determining action in S304 in FIG. 3A and FIG. 3B. For example, the determining action in S304 determines the receiving relationship according to the receiving relationship rule. The generation unit 702 may perform a generation action in S304 in FIG. 3A and FIG. 3B. The sending unit 703 may perform S305 in FIG. 3A and FIG. 3B. In one embodiment, the routing device 700 may further include an obtaining unit and a receiving unit. The obtaining unit performs S301, and the receiving unit performs S303.

Figure 8:
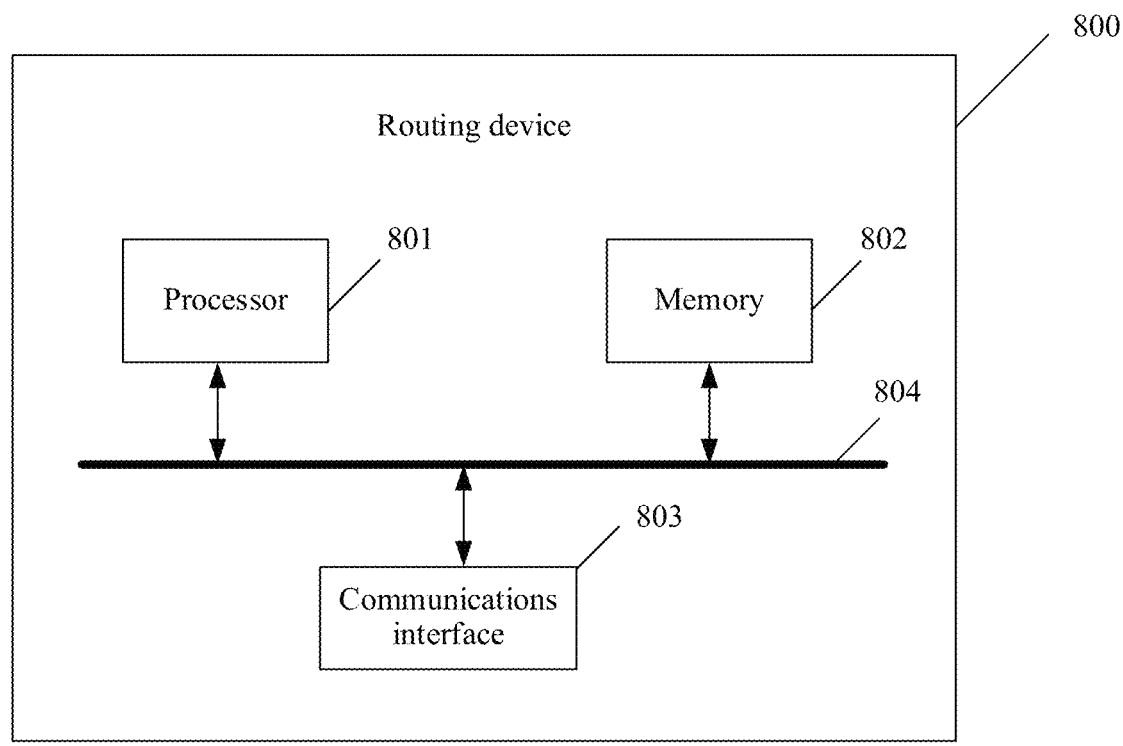
FIG. 8 is a block diagram of a routing device according to an embodiment of the present disclosure.

FIG. 8 is a possible block diagram of a first border node related in the embodiment in FIG. 3A and FIG. 3B. The first border node may be a routing device 800, and the routing device 800 includes a processor 801, a memory 802, a communications interface 803, and a bus 804. A structure thereof is similar to that in the embodiment in FIG. 6. The communications interface 803 is configured to perform S305. In one embodiment, the communications interface 803 may further perform S301 and S303. The processor 801 is configured to store a computer program. The computer program includes a program instruction. The processor 801 is configured to invoke the program instruction to perform S304. For example, a determining action in S304 determines the receiving relationship according to the receiving relationship rule.

Figure 9:
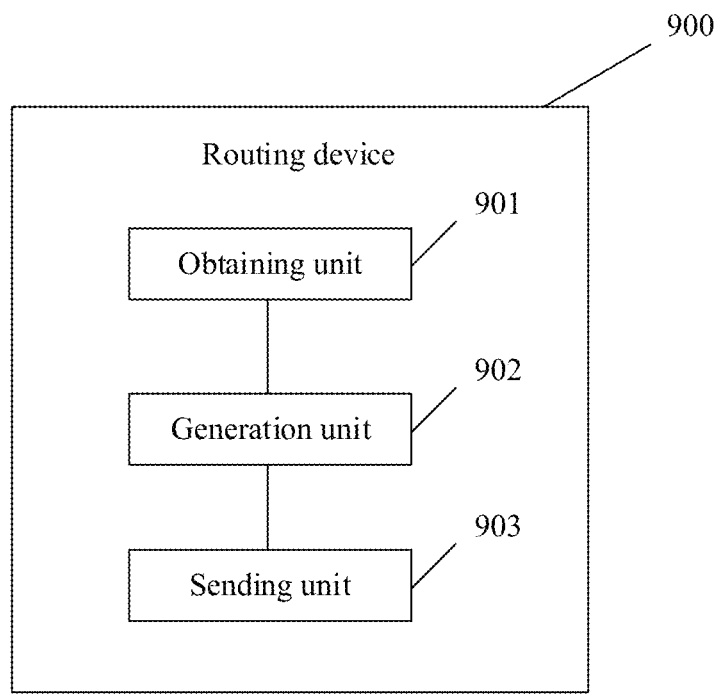
FIG. 9 is a block diagram of a routing device according to an embodiment of the present disclosure.

FIG. 9 is a possible block diagram of a first border node related in the embodiments shown in FIG. 4A-1 and FIG. 4A-2 and FIG. 4B-1 and FIG. 4B-2. The first border node may be a routing device 900, and the routing device 900 includes an obtaining unit 901, a generation unit 902, and a sending unit 903. The obtaining unit 901 performs S401 in FIG. 4A-1 and FIG. 4A-2 and FIG. 4B-1 and FIG. 4B-2. The generation unit 902 performs S402 in FIG. 4A-1 and FIG. 4A-2 and FIG. 4B-1 and FIG. 4B-2. The sending unit 903 performs S403 in FIG. 4A-1 and FIG. 4A-2 and FIG. 4B-1 and FIG. 4B-2. In one embodiment, a receiving unit is further included. The receiving unit performs S407 in FIG. 4B-1 and FIG. 4B-2. The generation unit 902 further performs S408 in FIG. 4B-1 and FIG. 4B-2. The sending unit 903 further performs S409 in FIG. 4B-1 and FIG. 4B-2.

Figure 10:
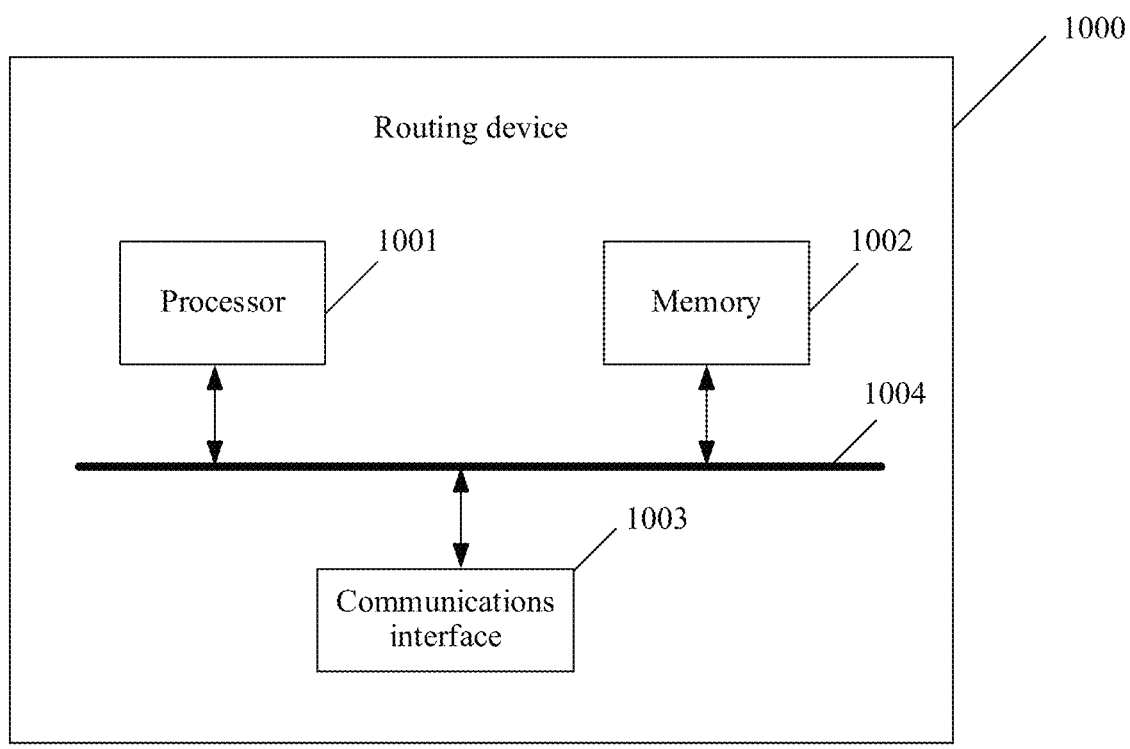
FIG. 10 is a block diagram of a routing device according to an embodiment of the present disclosure.

FIG. 10 is a possible block diagram of a first border node related in the embodiments shown in FIG. 4A-1 and FIG. 4A-2 and FIG. 4B-1 and FIG. 4B-2. The first border node may be a routing device 1000, and the routing device 1000 includes a processor 1001, a memory 1002, a communications interface 1003, and a bus 1004. A structure thereof is similar to that in the embodiment in FIG. 6. The communications interface 1003 performs S401 and S403 in FIG. 4A-1 and FIG. 4A-2 and FIG. 4B-1 and FIG. 4B-2. The processor 1001 is configured to store a computer program. The computer program includes a program instruction. The processor 1001 is configured to invoke the program instruction to perform S402 in FIG. 4A-1 and FIG. 4A-2 and FIG. 4B-1 and FIG. 4B-2. In one embodiment, the communications interface 1003 may further perform S407 and S409 in FIG. 4B-1 and FIG. 4B-2. Correspondingly, the processor 1001 is further configured to invoke the program instruction to perform S408 in FIG. 4B-1 and FIG. 4B-2.

Figure 11:
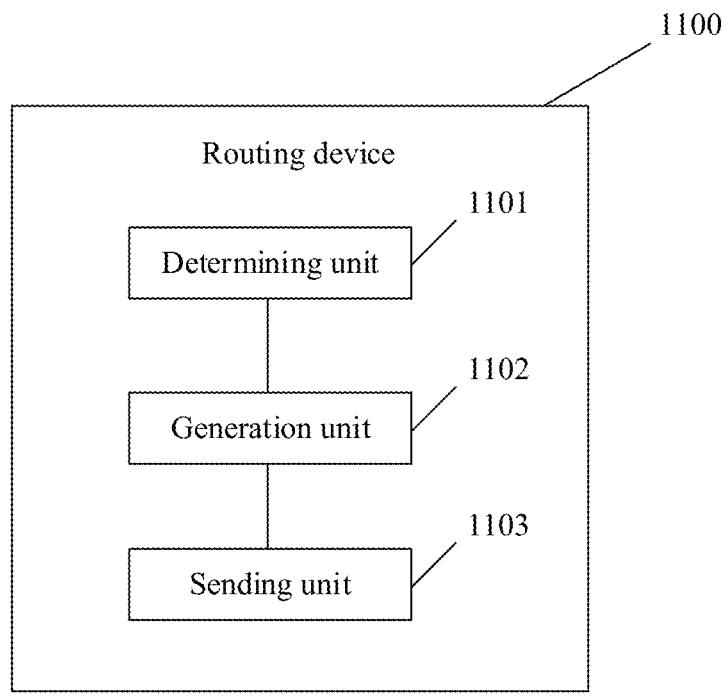
FIG. 11 is a block diagram of a routing device according to an embodiment of the present disclosure.

FIG. 11 is a possible block diagram of a second border node related in the embodiment in FIG. 3A and FIG. 3B. The second border node may be a routing device 1100, and the routing device 1100 includes a determining unit 1101, a generation unit 1102, and a sending unit 1103. The determining unit 1101 performs S307. For example, a determining action in S304 determines the sending relationship according to the sending relationship rule. The generation unit 1102 performs S307. The sending unit 1103 performs S308. In one embodiment, the routing device 1100 may further include an obtaining unit and a sending unit. The obtaining unit performs S302, and the sending unit performs S306.

Figure 12:
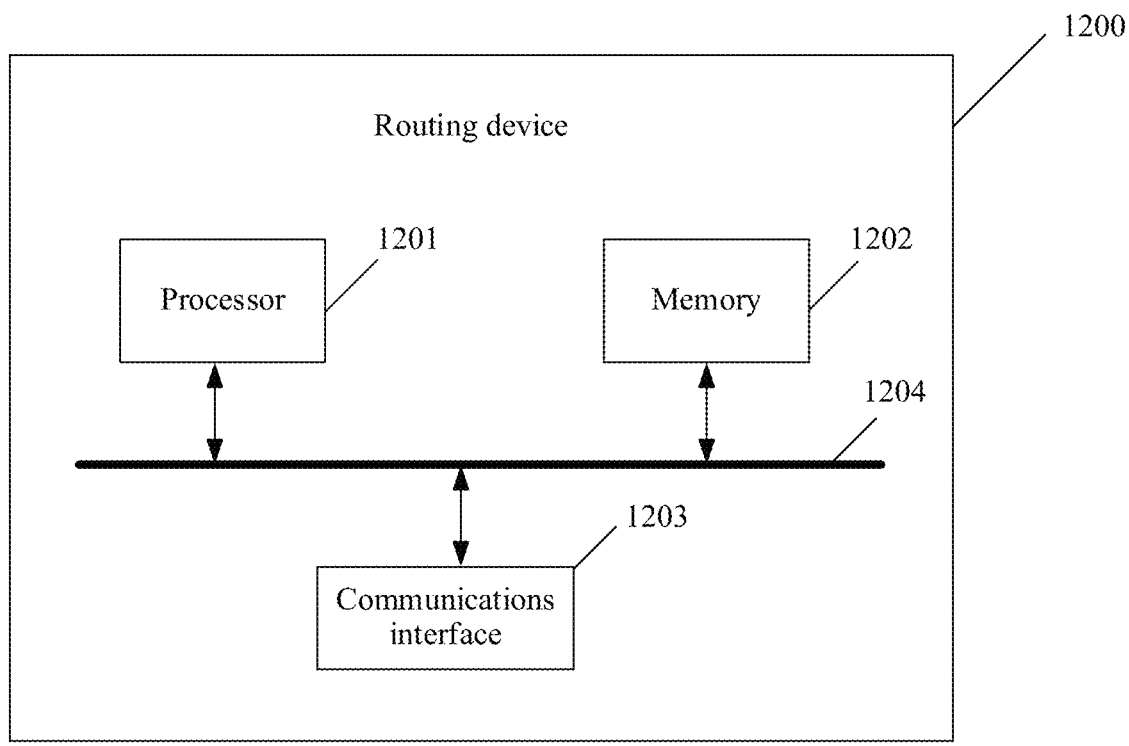
FIG. 12 is a block diagram of a routing device according to an embodiment of the present disclosure.

FIG. 12 is a possible block diagram of a second border node related in the embodiment in FIG. 3A and FIG. 3B. The second border node may be a routing device 1200, and the routing device 1200 includes a processor 1201, a memory 1202, a communications interface 1203, and a bus 1204. A structure thereof is similar to that in the embodiment in FIG. 6. The communications interface 1203 is configured to perform S308. The processor 1201 is configured to store a computer program. The computer program includes a program instruction. The processor 1201 is configured to invoke the program instruction to perform S307. For example, a determining action in S307 determines the receiving relationship according to the receiving relationship rule. In one embodiment, the communications interface 1203 is further configured to perform S302 and S306.

Figure 13:
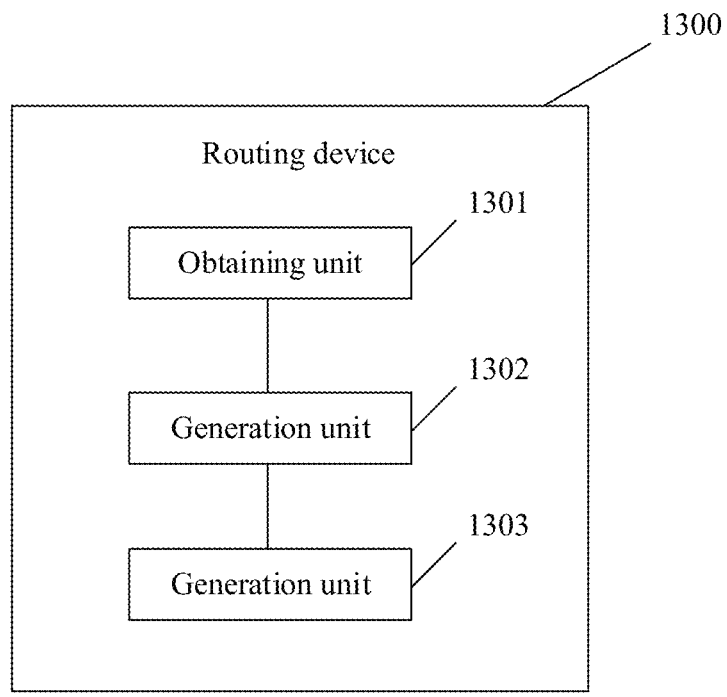
FIG. 13 is a block diagram of a routing device according to an embodiment of the present disclosure.

FIG. 13 is a possible block diagram of a second border node related in the embodiments shown in FIG. 4A-1 and FIG. 4A-2 and FIG. 4B-1 and FIG. 4B-2. The second border node may be a routing device 1300, and the routing device 1300 includes an obtaining unit 1301, a generation unit 1302, and a sending unit 1303. The obtaining unit performs S404 in FIG. 4A-1 and FIG. 4A-2 or S405 in FIG. 4B-1 and FIG. 4B-2. The generation unit 1302 performs S405 and S408 in FIG. 4A-1 and FIG. 4A-2, or S405 and S411 in FIG. 4B-1 and FIG. 4B-2. The sending unit 1303 performs S406, S407, and S409 in FIG. 4A-1 and FIG. 4A-2, or S406, S410, and S412 in FIG. 4B-1 and FIG. 4B-2.

Figure 14:
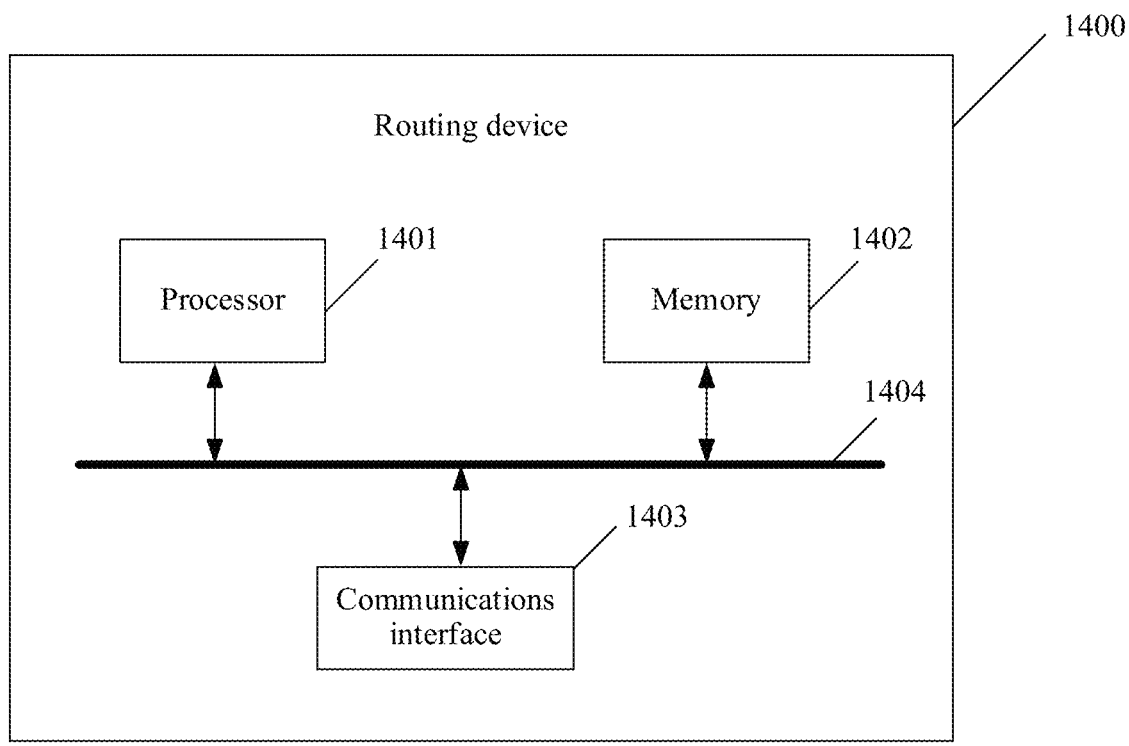
FIG. 14 is a block diagram of a routing device according to an embodiment of the present disclosure.

FIG. 14 is a possible block diagram of a second border node related in the embodiments shown in FIG. 4A-1 and FIG. 4A-2 and FIG. 4B-1 and FIG. 4B-2. The second border node may be a routing device 1400, and the routing device 1400 includes a processor 1401, a memory 1402, a communications interface 1403, and a bus 1404. A structure thereof is similar to that in the embodiment in FIG. 6. The communications interface 1403 is configured to perform S404, S406, S407, and S409 in FIG. 4A-1 and FIG. 4A-2, or S405, S406, S410, and S412 in FIG. 4B-1 and FIG. 4B-2. The processor 1401 is configured to store a computer program. The computer program includes a program instruction. The processor 1401 is configured to invoke the program instruction to perform S405 and S408 in FIG. 4A-1 and FIG. 4A-2, or S405 and S411 in FIG. 4B-1 and FIG. 4B-2.

Figure 15:
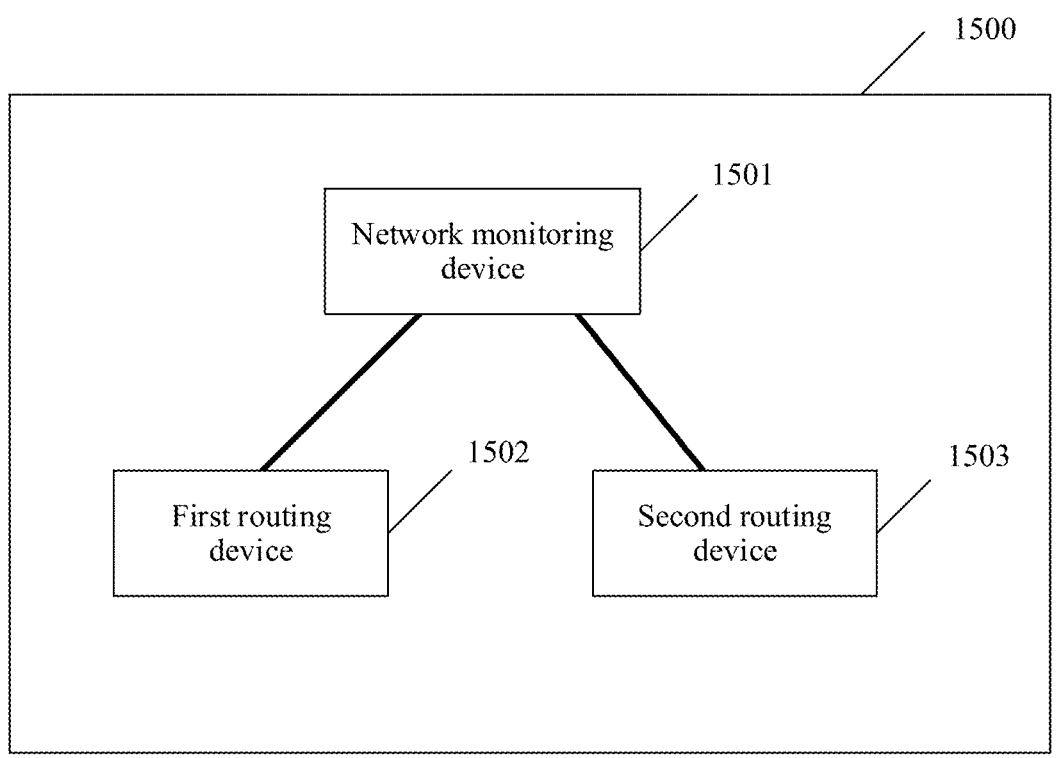
FIG. 15 is a block diagram of a system for determining a route leak according to an embodiment of the present disclosure.

FIG. 15 provides a system 1500 for determining a route leak. The system 1500 is configured to implement the method for determining a route leak in the foregoing method embodiments. The system 1500 includes a network monitoring device 1501, a first routing device 1502, and a second network device 1503. The network monitoring device 1501, the first routing device 1502, and the second network device 1503 may respectively implement functions of the network monitoring device, the first border node, and the second border node in the embodiments shown in FIG. 3A and FIG. 3B, FIG. 4A-1 and FIG. 4A-2, or FIG. 4B-1 and FIG. 4B-2. For example, the first monitoring device 1501 may be the monitoring device in the embodiment in FIG. 5 or FIG. 6. The first routing device 1502 may be the routing device in the embodiments shown in FIG. 7 to FIG. 10. The first routing device 1503 may be the routing device in the embodiments shown in FIG. 11 to FIG. 14.

An embodiment of the present disclosure further provides a computer-readable storage medium. The computer-readable storage medium stores a program. When the program is run, a computer is enabled to perform the method in the foregoing method embodiments.

When an integrated unit is used, units in the foregoing device embodiments may be integrated. For example, the determining unit 701 and the generation unit 702 in the embodiment in FIG. 7 may be combined into one unit. The obtaining unit, the receiving unit, and the sending unit in the embodiment in FIG. 9 may be combined into one unit.

"First" in the first network device in the embodiments of the present disclosure is merely used as a name identifier, and does not represent the first in sequence. For the words "second" and "third", this rule also applies.

It should be noted that any apparatus embodiment described above is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the embodiments of the routing device or the network monitoring device provided by the present disclosure, connection relationships between modules indicate that the modules have communication connections with each other, which may be specifically implemented as one or more communications buses or signal cables. Persons of ordinary skill in the art may understand and implement the embodiments of the present disclosure without creative efforts.

Methods or algorithm operations described in combination with the content disclosed in this embodiment of the present disclosure may be implemented by hardware, or may be implemented by a processor by executing a software instruction. The software instruction may include a corresponding software module. The software module may be stored in a random access memory (random access memory, RAM), a flash memory, a read-only memory (read-only memory, ROM), an erasable programmable read-only memory (erasable programmable ROM, EPROM), an electrically erasable programmable read-only memory (Electrically EPROM, EEPROM), a hard disk, a removable hard disk, a compact disc, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC.

Persons skilled in the art should be aware that in the foregoing one or more examples, functions described in the present disclosure may be implemented by hardware, software, firmware, or any combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

The objectives, technical solutions, and benefits of the present disclosure are further described in detail in the foregoing specific embodiments. It should be understood that the foregoing descriptions are merely specific embodiments of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A network monitoring device comprising,
   one or more communication interface configured to receive an extended border gateway protocol monitoring protocol (BMP) packet sent by a first border node of a first autonomous system and an extended BMP packet sent by a second border node of the first autonomous system, wherein the network monitoring device manages the first autonomous system;
   a processor to execute a program instruction from a memory to:
   determine, based on the extended BMP packet sent by the first border node and the extended BMP packet sent by the second border node of the first autonomous system, a receiving relationship of a route prefix received by the first border node from a second autonomous system, and a sending relationship of the route prefix sent by the second border node to a third autonomous system, wherein the receiving relationship is a client-to-provider relationship, a peer-to-peer relationship, or a provider-to-client relationship, and the sending relationship is the client-to-provider relationship, the peer-to-peer relationship, or the provider-to-client relationship; and
   determine, based on the receiving relationship and the sending relationship, whether the route prefix is leaked.

2. The network monitoring device according to claim 1, wherein the one or more communication interfaces are configured to receive a first extended BMP route monitoring packet sent by the first border node, wherein the first extended BMP route monitoring packet carries the receiving relationship; and
   receive a second extended BMP route monitoring packet sent by the second border node, wherein the second extended BMP route monitoring packet carries the sending relationship; and
   wherein the processor to execute a program instruction from a memory is further to
   determine the receiving relationship and the sending relationship based on the receiving relationship carried in the first extended BMP route monitoring packet and the sending relationship carried in the second extended BMP route monitoring packet.

3. The network monitoring device according to claim 1, wherein the one or more communication interfaces are configured to receive a first extended BMP peer up notification packet sent by the first border node, wherein the first extended BMP peer up notification packet carries a receiving relationship rule for receiving, by the first border node, routing information from the second autonomous system, and wherein the receiving relationship rule comprises receiving based on the client-to-provider relationship, receiving based on the peer-to-peer relationship, or receiving based on the provider-to-client relationship;
   receive a second extended BMP peer up notification packet sent by the second border node, wherein the second extended BMP peer up notification packet carries a sending relationship rule for sending, by the second border node, routing information to the third autonomous system, and wherein the sending relationship rule comprises sending based on the client-to-provider relationship, sending based on the peer-to-peer relationship, or sending based on the provider-to-client relationship; and
   receive a BMP route monitoring packet sent by the second border node, wherein the BMP route monitoring packet indicates that a transfer path of the route prefix sequentially comprises the second autonomous system, the first autonomous system, and the third autonomous system; and
   wherein the processor to execute a program instruction from a memory is further to determine the receiving relationship and the sending relationship according to the receiving relationship rule carried in the first extended BMP peer up notification packet, the sending relationship rule carried in the second extended BMP peer up notification packet, and the transfer path of the route prefix carried in the BMP route monitoring packet.

4. The network monitoring device according to claim 1, wherein the one or more communication interfaces are configured to receive a first extended BMP peer up notification packet sent by the first border node, wherein the first extended BMP peer up notification packet carries a receiving relationship rule for receiving, by the first border node, routing information from the second autonomous system, and wherein the receiving relationship rule comprises receiving based on the client-to-provider relationship, receiving based on the peer-to-peer relationship, or receiving based on the provider-to-client relationship;

receive a second extended BMP peer up notification packet sent by the second border node, wherein the second extended BMP peer up notification packet carries a sending relationship rule for sending, by the second border node, routing information to the third autonomous system, and wherein the sending relationship rule comprises sending based on the client-to-provider relationship, sending based on the peer-to-peer relationship, or sending based on the provider-to-client relationship;

receive a first BMP route monitoring packet sent by the first border node, wherein the first BMP route monitoring packet indicates that the first border node has received the route prefix from the second autonomous system; and receive a second BMP route monitoring packet sent by the second border node, wherein the second BMP route monitoring packet indicates that the second border node has sent the route prefix to the third autonomous system; and wherein the processor to execute a program instruction from a memory is further to determine the receiving relationship and the sending relationship according to the receiving relationship rule carried in the first extended BMP peer up notification packet, the sending relationship rule carried in the second extended BMP peer up notification packet, the first BMP route monitoring packet, and the second BMP route monitoring packet.

5. The network monitoring device according to claim 1, wherein the one or more communication interfaces are further configured to output alarm information after determining that a route leak occurs in the route prefix, wherein the alarm information indicates that the route prefix is leaked from the first autonomous system to the third autonomous system.

6. The network monitoring device according to claim 1, wherein the processor to execute a program instruction from a memory is further:

determine that the route prefix is leaked if the receiving relationship is the peer-to-peer relationship, and the sending relationship is the peer-to-peer relationship; or determine that the route prefix is leaked if the receiving relationship is the peer-to-peer relationship, and the sending relationship is the client-to-provider relationship; or determine that the route prefix is leaked if the receiving relationship is the provider-to-client relationship, and the sending relationship is the peer-to-peer relationship; or determine that the route prefix is leaked if the receiving relationship is the provider-to-client relationship, and the sending relationship is the client-to-provider relationship.

7. A routing device comprising, a processor to execute a program instruction from a memory to:

determine a receiving relationship of a route prefix that has been received from a second autonomous system, wherein the receiving relationship is a client-to-provider relationship, a peer-to-peer relationship, or a provider-to-client relationship, wherein the routing device is a border node of a first autonomous system; and generate an extended border gateway protocol monitoring protocol (BMP) route monitoring packet comprising the receiving relationship; and one or more communication interfaces configured to send the extended BMP route monitoring packet to a network monitoring device of the first autonomous system.

8. The routing device according to claim 7, wherein the one or more communication interfaces are further configured to obtain a receiving relationship rule for receiving routing information from the second autonomous system, wherein the receiving relationship rule comprises receiving based on the client-to-provider relationship, receiving based on the peer-to-peer relationship, or receiving based on the provider-to-client relationship; and receive routing information comprising the prefix from the second autonomous system; and wherein the processor to execute a program instruction from a memory is further to determine the receiving relationship according to the receiving relationship rule.

9. The routing device according to claim 7, wherein an extension manner of the extended BMP route monitoring packet is to add an extension field, wherein a packet format of the extension field is a type-length-value format, wherein a value of a type field being a first preset value indicates a relationship between a route prefix source autonomous system and a local autonomous system, wherein the value of the type field being a second preset value indicates a relationship between a local autonomous system and a destination autonomous system to which a route prefix is sent;

wherein a value of a value field being a third preset value indicates the client-to-provider relationship, wherein the value of the value field being a fourth preset value indicates the peer-to-peer relationship, and wherein the value of the value field being a fifth preset value indicates the provider-to-client relationship.

10. A routing device comprising:

a processor to execute a program instruction from a memory to determine a sending relationship of a route prefix sent to a third autonomous system, wherein the sending relationship is a client-to-provider relationship, a peer-to-peer relationship, or a provider-to-client relationship, wherein the routing device is a border node of a first autonomous system; and generate an extended border gateway protocol monitoring protocol (BMP) route monitoring packet comprising the sending relationship; and one or more communication interfaces configured to send the extended BMP route monitoring packet to a network monitoring device of the first autonomous system.

11. The routing device according to claim 10, wherein the one or more communication interfaces are further configured to:
  obtain a sending relationship rule for sending routing information to the third autonomous system, wherein the sending relationship rule comprises sending based on the client-to-provider relationship, sending based on the peer-to-peer relationship, or sending based on the provider-to-client relationship; and
  wherein the processor to execute a program instruction from a memory is further to
  determine the sending relationship according to the sending relationship rule.

12. The routing device according to claim 10, wherein an extension manner of the extended BMP route monitoring packet is to add an extension field, wherein a packet format of the extension field is a type-length-value format, wherein
  a value of a type field being a first preset value indicates a relationship between a route prefix source autonomous system and a local autonomous system, wherein the value of the type field being a second preset value indicates a relationship between a local autonomous system and a destination autonomous system to which a route prefix is sent;
  wherein a value of a value field being a third preset value indicates the client-to-provider relationship, wherein the value of the value field being a fourth preset value indicates the peer-to-peer relationship, and wherein the value of the value field being a fifth preset value indicates the provider-to-client relationship.

* * * * *